(12) United States Patent
Kita

(10) Patent No.: US 12,705,155 B2
(45) Date of Patent: Aug. 11, 2026

(54) CONTROL OF CONDITIONS FOR EXECUTION OF ACTIONS ON ELEMENTS INCLUDED IN COMMUNICATION SYSTEM

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 376 days.

(21) Appl. No.: 18/572,183

(22) PCT Filed: Nov. 21, 2022

(86) PCT No.: PCT/JP2022/043038
§ 371 (c)(1),
(2) Date: Dec. 20, 2023

(87) PCT Pub. No.: WO2024/111025
PCT Pub. Date: May 30, 2024

(65) Prior Publication Data
US 2025/0094304 A1 Mar. 20, 2025

(51) Int. Cl.
*G06F 11/34* (2006.01)

(52) U.S. Cl.
CPC ................................ *G06F 11/3409* (2013.01)

(58) Field of Classification Search
CPC ........ G06F 11/3409; G06F 9/50; G06F 11/34; H04L 41/0897; H04L 41/0895; H04L 41/147; H04L 41/16; H04L 41/40; H04L 41/5009; H04L 43/20; H04W 24/02; H04W 24/04
See application file for complete search history.

(56) References Cited

U.S. PATENT DOCUMENTS 9,756,518 B1 * 9/2017 Sheen ................... H04W 16/18
2020/0013107 A1 1/2020 Kusano
2021/0263792 A1 8/2021 Vah et al.
2023/0388985 A1 * 11/2023 Atawia ............... H04W 72/543
(Continued)

FOREIGN PATENT DOCUMENTS

CA 2983495 A1 * 5/2018 ......... H04L 41/5067
CN 113126881 A * 7/2021 ............... G06F 8/71
(Continued)

OTHER PUBLICATIONS

Machine translation of Lan, CN 113126881 A, 1 page (Year: 2021).*
Machine translation of Hayinaer, CN 118509905 A, pp. 1-2 (Year: 2024).*

*Primary Examiner* — Christopher A Revak
(74) *Attorney, Agent, or Firm* — HAUPTMAN HAM, LLP

(57) ABSTRACT

It is enabled to optimize an execution condition of an action on an element included in a communication system. A policy manager (90) changes, when a reception status of an instruction to execute the action on the element satisfies a given change condition, the action execution condition to a condition determined based on the reception status of the execution instruction. The policy manager (90), a life cycle manager (94), a container manager (78), and a configuration manager (76) execute, after the action execution condition is changed, the action on the element in response to a performance index value satisfying the changed action execution condition.

15 Claims, 21 Drawing Sheets

MODEL MANAGEMENT DATA

PURPOSE MANAGEMENT DATA

| PURPOSE ID | 0001 |
|---|---|
| PURPOSE DATA | a1 |

AI MANAGEMENT DATA

| AIID | 001 | 002 | 003 |
|---|---|---|---|
| INPUT PERFORMANCE INDEX VALUE DATA | b11 | b21 | b31 |
| | | | b32 |
| | | b22 | b33 |

(56) References Cited

U.S. PATENT DOCUMENTS

| | | | | |
|---|---|---|---|---|
| 2024/0056892 | A1* | 2/2024 | Zhan | H04W 24/02 |
| 2025/0350791 | A1* | 11/2025 | Sodagar | H04L 45/42 |

FOREIGN PATENT DOCUMENTS

| | | | | | |
|---|---|---|---|---|---|
| CN | 118509905 | A | * | 8/2024 | H04W 24/08 |
| JP | 2015-149578 | A | | 8/2015 | |
| KR | 10-2022-0042535 | A | | 4/2022 | |
| WO | 2018181826 | A1 | | 10/2018 | |
| WO | WO-2025201657 | A1 | * | 10/2025 | G06N 3/006 |
| WO | WO-2025210165 | A1 | * | 10/2025 | H04L 5/0048 |

* cited by examiner

FIG.6

| SERVER ID |
| --- |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

CONTROL OF CONDITIONS FOR EXECUTION OF ACTIONS ON ELEMENTS INCLUDED IN COMMUNICATION SYSTEM

RELATED APPLICATIONS

The present application is a National Phase of International Application Number PCT/JP2022/043038, filed Nov. 21, 2022.

TECHNICAL FIELD

The present invention relates to control of conditions for execution of actions on elements included in a communication system.

BACKGROUND ART

In Patent Literature 1, it is described that a network function virtualization orchestrator (NFVO) performs healing and scaling of a virtualized network function (VNF).

In addition, in Patent Literature 1, it is described that a traffic analysis module monitors traffic of a customer network and analyzes a type and flow of the traffic.

CITATION LIST

Patent Literature

[Patent Literature 1] WO 2018/181826 A1

SUMMARY OF INVENTION

Technical Problem

In the technology as described in Patent Literature 1, it is conceivable to execute actions such as healing and scaling of elements such as VNFs included in a communication system in response to satisfaction of a condition set in advance.

However, the set condition may not be sufficiently strict for a user such as an administrator of the communication system, and hence the user may monitor performance index values of the elements included in the communication system and explicitly instruct the execution of an action on those elements at a timing determined as requiring an action be executed.

The present invention has been made in view of the above-mentioned circumstances, and has an object to enable an execution condition of an action on an element included in a communication system to be optimized.

Solution to Problem

In order to solve the above-mentioned problem, according to one embodiment of the present disclosure, there is provided an action execution control system including: performance information provision means for providing performance information indicating a performance index value of an element included in a communication system; conditional action execution means for executing an action on the element in response to the performance index value satisfying a given action execution condition; instructed action execution means for executing the action on the element in response to an instruction to execute the action on the element received in a situation in which the performance index value does not satisfy the action execution condition; and condition change means for changing, when a reception status of the execution instruction satisfies a given change condition, the action execution condition to a condition determined based on the reception status of the execution instruction, wherein, after the given action execution condition is changed, the conditional action execution means is configured to execute the action on the element in response to the performance index value satisfying the changed action execution condition.

Further, according to one embodiment of the present disclosure, there is provided an action execution control method including: providing performance information indicating a performance index value of an element included in a communication system; executing an action on the element in response to the performance index value satisfying a given action execution condition; executing the action on the element in response to an instruction to execute the action on the element received in a situation in which the performance index value does not satisfy the action execution condition; changing, when a reception status of the execution instruction satisfies a given change condition, the given action execution condition to a condition determined based on the reception status of the execution instruction; and executing, after the action execution condition is changed, the action on the element in response to the performance index value satisfying the changed action execution condition.

BRIEF DESCRIPTION OF DRAWINGS

FIG. 6 is a diagram for illustrating an example of data structure of physical inventory data.

DESCRIPTION OF EMBODIMENTS

[Overall Configuration]

One embodiment of the present invention is now described in detail with reference to the drawings.

Figure 1:
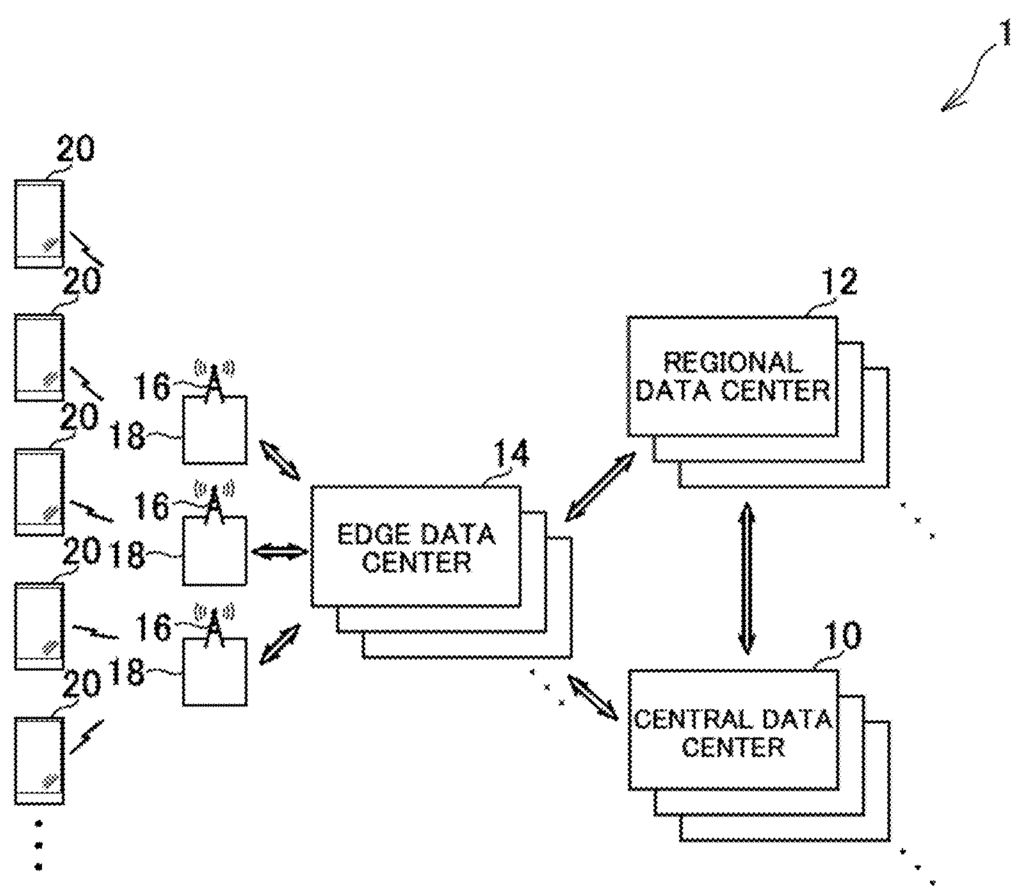
FIG. 1 is a diagram for illustrating an example of a communication system in one embodiment of the present invention.
Figure 2:
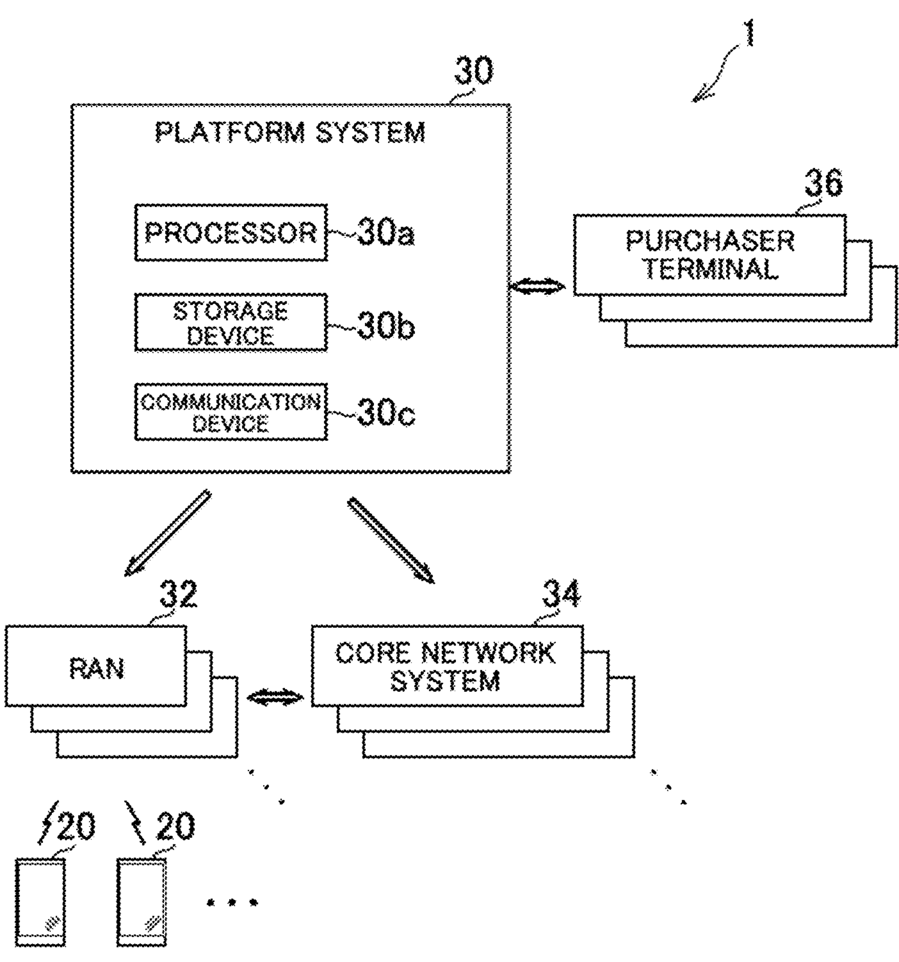
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included n the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. In this case, as illustrated in FIG. 1, one edge data center 14 may be capable of communicating to and from several communication facilities 18. The communication facility 18 may include a computer such as a server computer. The communication facility 18 in this embodiment performs radio communication from a user equipment (UE) 20 via the antenna 16. The communication facility 18 provided with the antenna 16 is provided with, for example, a radio unit (RU), which is described later.

A plurality of servers are arranged in each of the central data centers 10, the regional data centers 12, and the edge data centers 14 in this embodiment.

In this embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in this embodiment includes a platform system 30, a plurality of radio access networks (RANs) 32, a plurality of core network systems 34, a purchaser terminal 36, and a plurality of UEs 20. The core network system 34, the RAN 32, and the UE 20 cooperate with each other to implement a mobile communication network.

The RAN 32 is a computer system, which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANs 32 in this embodiment are implemented mainly by server groups arranged in the edge data centers 14 and the communication facilities 18. A part of the RAN 32 (for example, distributed unit (DU) or central unit (CU) or virtual distributed unit (vDU) or virtual central unit (vCU)) may be implemented by the central data center 10 or the regional data center 12 instead of the edge data center 14.

The core network system 34 is a system corresponding to an evolved packet core (EPC) in 4G or a 5G core (5GC) in 5G. The core network systems 34 in this embodiment are implemented mainly by server groups arranged in the central data centers 10 or the regional data centers 12.

The platform system 30 in this embodiment is configured, for example, on a cloud platform and includes a processor 30*a*, a storage device 30*b*, and a communication device 30*c*, as illustrated in FIG. 2. The processor 30*a* is a program control device such as a microprocessor which operates in accordance with a program installed in the platform system 30. The storage device 30*b* is, for example, a storage element such as a ROM or RAM, a solid state drive (SSD), a hard disk drive (HDD), or the like. The storage device 30*b* stores a program to be executed by the processor 30*a*, and the like. The communication device 30*c* is, for example, a communication interface such as a network interface controller (NIC) or a wireless local area network (LAN) module. Software-defined networking (SDN) may be implemented in the communication device 30*c*. The communication device 30*c* exchanges data with the RAN 32 and the core network system 34.

In this embodiment, the platform system 30 is implemented by a server group arranged in the central data center 10. The platform system 30 may be implemented by a server group arranged in the regional data center 12.

In this embodiment, for example, in response to a purchase request for a network service (NS) by a purchaser, the network service for which the purchase request has been made is constructed in the RAN 32 or the core network system 34. Then, the constructed network service is provided to the purchaser.

For example, network service, such as a voice communication service, a data communication service, or the like, is provided to the purchaser who is a mobile virtual network operator (MVNO). The voice communication service or the data communication service provided in this embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in this embodiment, an Internet of things (IoT) service may be provided to an end user who uses a robot arm, a connected car, or the like. In this case, an end user who uses, for example, a robot arm, a connected car, or the like may be a purchaser of the network service in this embodiment.

The purchaser terminal 36 in this embodiment is, for example, a general computer such as a smartphone, a tablet terminal, or a personal computer used by the above-mentioned purchaser. The purchaser terminal 36 is used by a user such as an administrator of the network service purchased by the purchaser, for example. The purchaser terminal 36 is capable of communicating to and from the platform system 30 via a computer network such as the Internet.

Further, in this embodiment, for example, the purchaser terminal 36 used by the user, such as the administrator of the network service purchased by the purchaser, is capable of accessing information relating to the network service purchased by the purchaser, and is not capable of accessing information relating to network services purchased by other purchasers.

In this embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers a virtualization technology may be generated by such constructed. For example, a Kubernetes cluster managed by a container management tool such as Kubernetes (trademark) may be constructed. Then, a processor on the constructed cluster may execute a container-type application.

The network service provided to the purchaser in this embodiment is formed of one or a plurality of functional units (for example, network function (NF)). In this embodiment, the functional unit is implemented by the NF implemented by the virtualization technology. The NF implemented by the virtualization technology is called "virtualized network function (VNF)." It does not matter what kind of virtualization technology has been used for virtualization. For example, a containerized network function (CNF) implemented by a container-type virtualization technology is also included in the VNF in this description. This embodiment is described on the assumption that the network service is implemented by one or a plurality of CNFs. The functional unit in this embodiment may also correspond to a network node.

Figure 3:
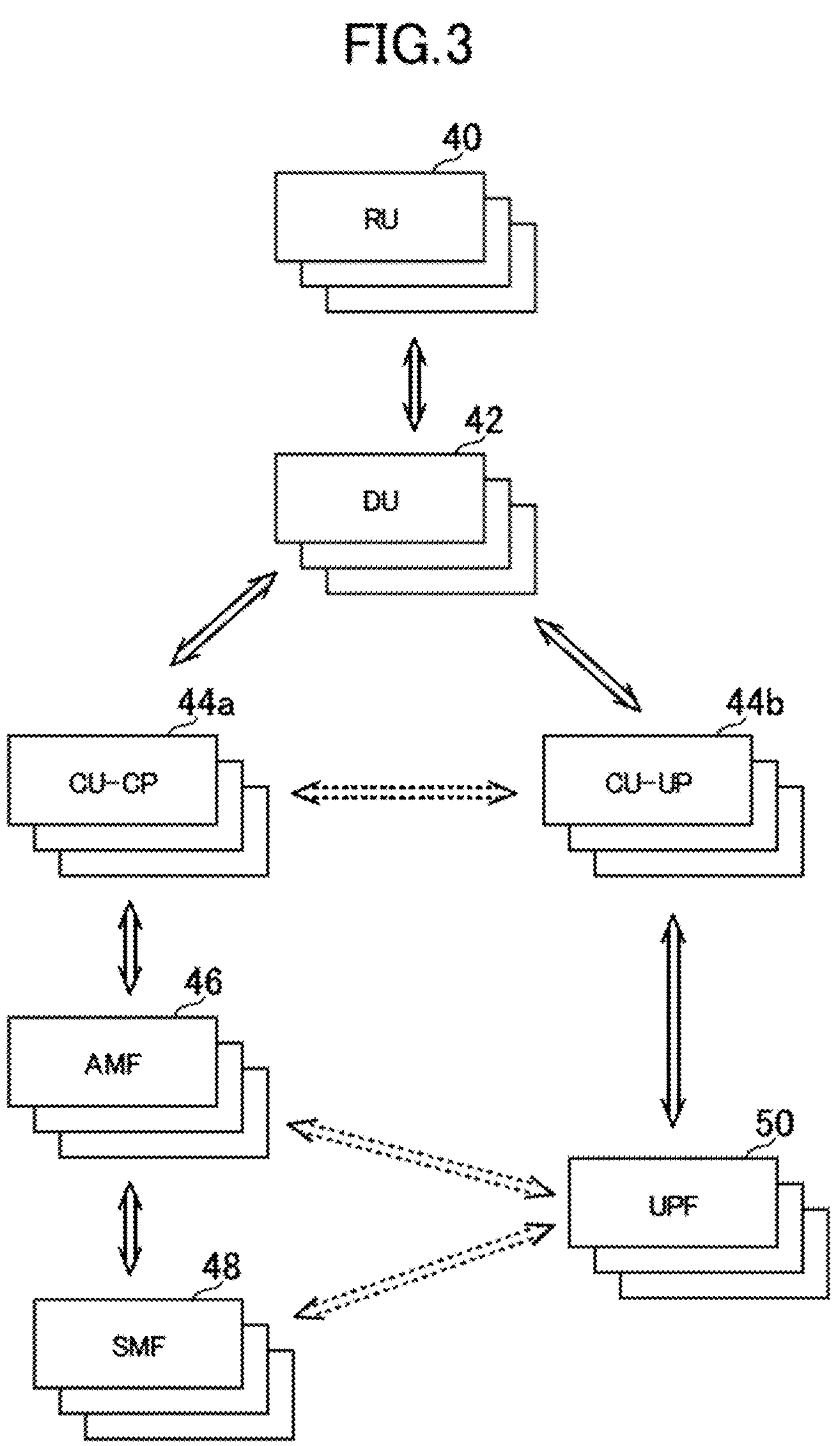
FIG. 3 is a diagram for schematically illustrating an example of a network service in the one embodiment of the present invention.

FIG. 3 is a diagram for schematically illustrating an example of an operating network service. The network service illustrated in FIG. 3 includes NEs, such as a plurality of RUs 40, a plurality of DUs 42, a plurality of CUs 44 (central unit-control planes (CU-CPs) 44*a* and central unit-user planes (CU-UPs) 44*b*), a plurality of access and mobility management functions (AMFs) 46, a plurality of session management functions (SMFs) 48, and a plurality of user plane functions (UPFs) 50, as software elements.

In the example of FIG. 3, the RUs 40, the DUs 42, the CO-CPs 44*a*, the AMFs 46, and the SMEs 48 correspond to elements of the control plane (C-plane), and the RUs 40, the DUs 42, the CU-UPs 44*b*, and the UPFs 50 correspond to elements of the user plane (U-plane).

The network service may include other types of NEs as software elements. In addition, the network service is implemented on a plurality of servers or other computer resources (hardware elements).

In this embodiment, for example, the network service illustrated in FIG. 3 provides a communication service in a certain area.

In this embodiment, it is also assumed that the plurality of RUs 40, the plurality of DUs 42, the plurality of CU-UPS 44*b*, and the plurality of UPFs 50, which are illustrated in FIG. 3, belong to one end-to-end network slice.

Figure 4:
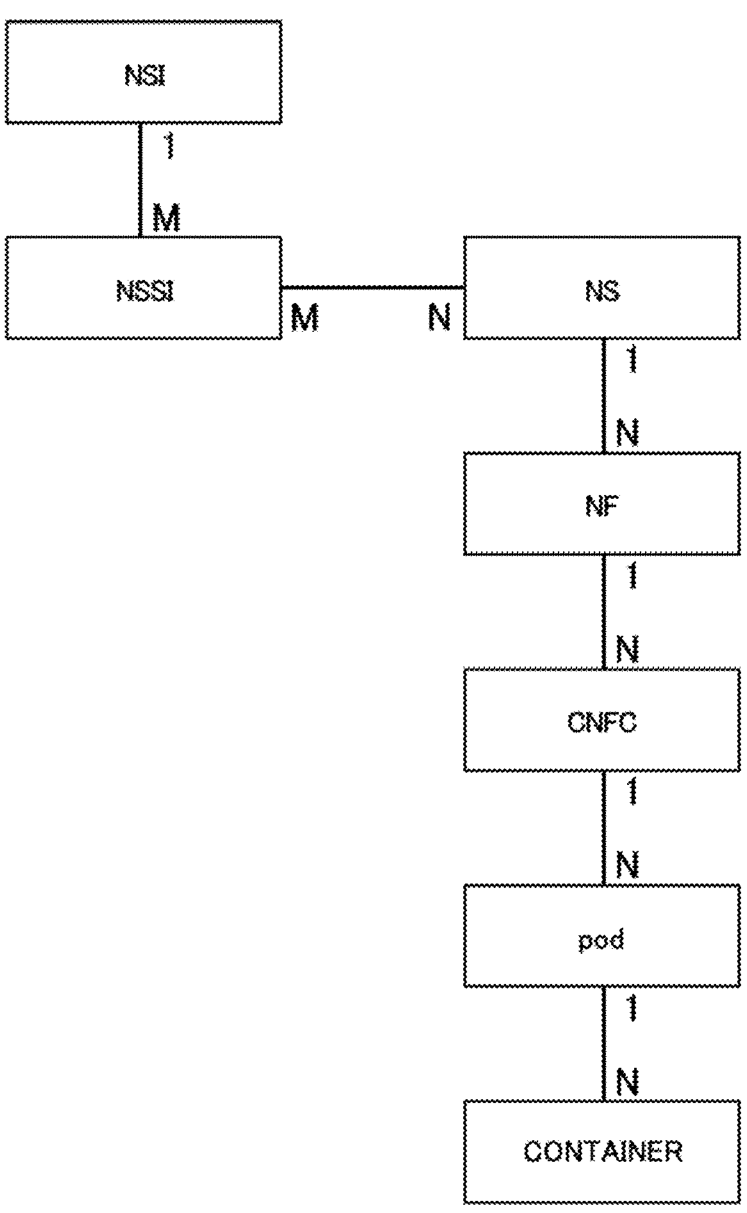
FIG. 4 is a diagram for illustrating an example of links between elements constructed in the communication system in the one embodiment of the present invention.

FIG. 4 is a diagram for schematically illustrating an example of links between elements constructed in the communication system 1 in this embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. In this case, the NS may correspond to an element having a granularity, such as a 5GC, an EPC, a 5G RAN (gNB), or a 4G RAN (eNB). Further, in this embodiment, the NS may have a nested structure.

In 5G, the NF corresponds to an element having a granularity, such as the RU, the DU, the CU-UP, the AMF, the SMF, or the UPF. In 4G, the NF corresponds to an element having a granularity, such as a mobility management entity (MME), a home subscriber server (HSS), a serving gateway (S-GW), a vDU, or a vCU. In this embodiment, for example, one NS includes one or a plurality of NFs. That is, one or a plurality of NEs are under the control of one NS.

The CNFC corresponds to an element having a granularity, such as DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPE, the AMF, the SMF, and the like. In this embodiment, for example, one NF includes one or a plurality of CNFCs. That is, one or a plurality of CNFCs are under the control of one NF.

The pod refers to, for example, the minimum unit for managing a Docker container by Kubernetes. In this embodiment, for example, one CNFC includes one or a plurality of pods. That is, one or a plurality of pods are under the control of one CNFC.

In this embodiment, for example, one pod includes one or a plurality of containers. That is, one or a plurality of containers are under the control of one pod.

In addition, as illustrated in FIG. 4, a network slice (NSI) and a network slice subnet instance (NSSI) have hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile back haul (MBH) domain, or a slice of a core network domain.

In this embodiment, for example, one NSI includes one or a plurality of NSSIs. That is, one or a plurality of NSSIs are under the control of one NSI. In this embodiment, a plurality of NSIs may share the same NSSI.

In addition, as illustrated in FIG. 4, the NSSI and the NS generally have a many-to-many relationship.

In addition, in this embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. In this case, the S-NSSAI is information associated with the network slice. The NF is not required to belong to the network slice.

Figure 5:
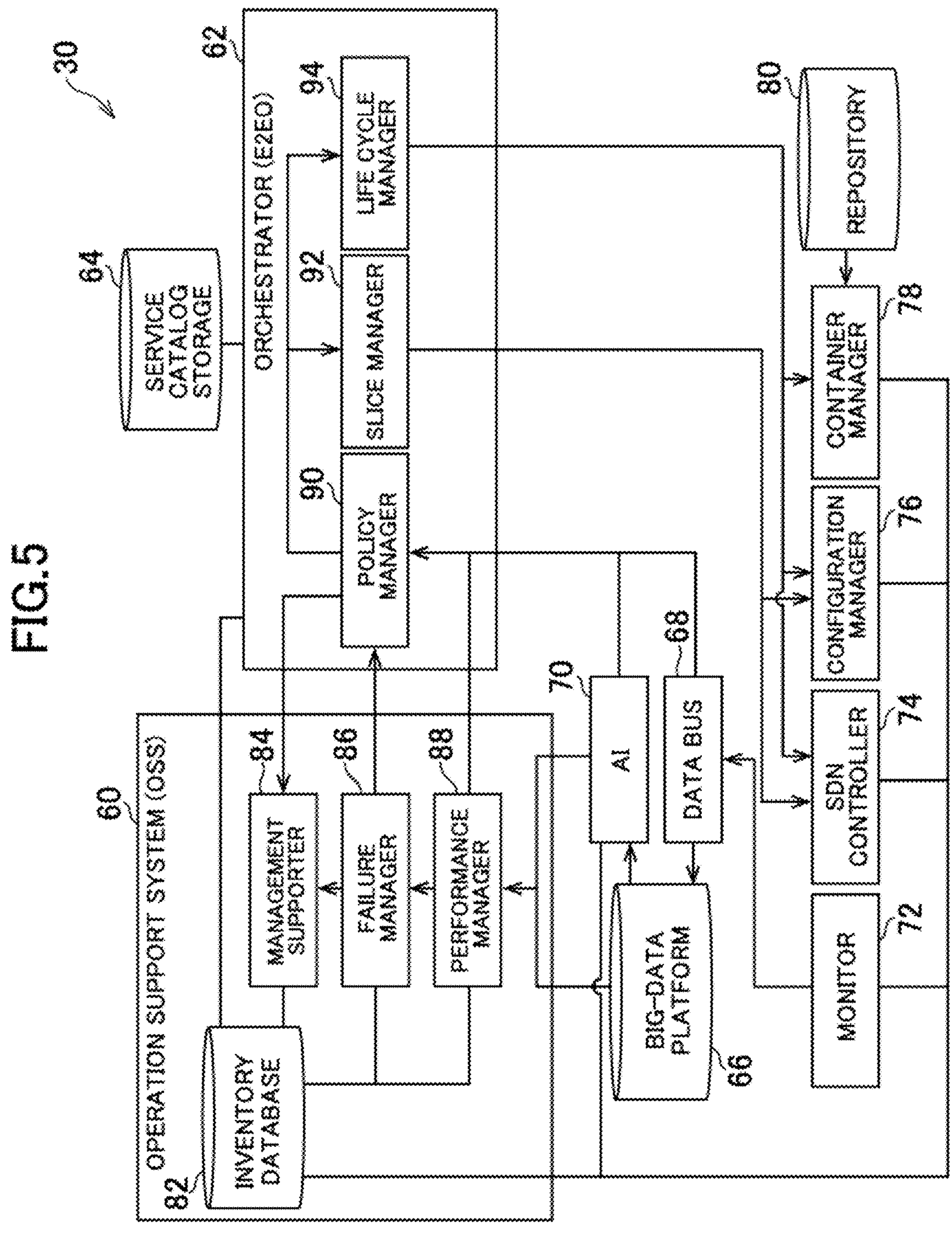
FIG. 5 is a functional block diagram for illustrating an example of functions implemented by a platform system in the one embodiment of the present invention.

FIG. 5 is a functional block diagram for illustrating an example of functions implemented by the platform system 30 in this embodiment. The platform system 30 in this embodiment is not required to implement all the functions illustrated in FIG. 5, and may implement functions other than those illustrated in FIG. 5.

As illustrated in FIG. 5, the platform system 30 in this embodiment functionally includes, for example, an operation 60, an (end-to-end-support system (OSS) orchestrator orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a management supporter 84, a failure manager 86, and a performance manager 88. The E2EO 62 includes a policy manager 90, a slice manager 92, and a life cycle manager 94. Those elements are implemented mainly by the processor 30*a*, the storage device 30*b*, and the communication device 30*c*.

The functions illustrated in FIG. 5 may be implemented by executing, by the processor 30*a*, a program that is installed in the platform system 30, which is one or a plurality of computers, and that includes instructions corresponding to the functions. This program may be supplied to the platform system 30 via a computer-readable information storage medium, such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

In this case, the platform system 30 in this embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In this embodiment, the repository 80 stores, for example, a container image of a container included in a functional unit group (for example, NF group) that implements a network service.

The inventory database 82 is a database in which inventory information is stored. The inventory information includes, for example, information on a server arranged in the RAN 32 or the core network system 34 and managed by the platform system 30.

Further, in this embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of the data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, an operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NEs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as an identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to a CNFC. The CNFC data indicates, for example, attributes such as an identifier of an instance of the CNFC and the type of the CNFC. The logical inventory data may also include pod data indicating information relating to a pod included in the CNFC. The pod data indicates, for example, attributes such as an identifier of an instance of the pod and the type of the pod. The logical inventory data may also include container data indicating information relating to a container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NE data.

The logical inventory data may also include data indicating NSSAI including one or a plurality of pieces of S-NSSAI, which is set for each NF.

Further, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. This service template data includes information required for constructing the network service. For example, the service template data includes information defining the NS, the NF, and the CNFC and information indicating an NS-NF-CNFC correspondence relationship. Further, for example, the service template data contains workflow a script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNEs or other functional units included in the network service for each type thereof. The NSD may also indicate a file name of a CNED described later, which relates to the CNF included in the network service.

Further, a CNF descriptor (CNED) is an example of the service template data. The CNED may indicate computer resources (for example, CPU, memory, and hard disk drive) required by the CNF. For example, the CNED may also indicate, for each of a plurality of containers included in the CNF, computer resources (such as CPU, memory, and hard disk drive) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template t data includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In this embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute this workflow script, to thereby instruct the container manager 78 to deploy the container included in the new network service to be purchased. Then, the container manager 78 may acquire the container image of the container from the repository 80 and deploy a container corresponding to the container image in the server.

In addition, in this embodiment, the life cycle manager 94 executes, for example, scaling or replacement of the element included in the communication system 1. In this case, the life cycle manager 94 may output a container deployment instruction or deletion instruction to the container manager 78. Then, the container manager 78 may execute, for example, a process for deploying a container or a process for deleting a container in accordance with the instruction. In this embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates communication route connecting those two IP addresses to each other. The created communication route may be managed so as to be linked to those two IP addresses.

The life cycle manager 94 may also output to the SDN controller 74 an instruction to create a communication route between two IP addresses linked to the two IP addresses.

In this embodiment, the slice manager 92 executes, for example, instantiation of a network slice. In this embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the third generation partnership project (3GPP) (trademark) specification "TS28 533." The NSMF is a function for generating and managing network slices, and provides an NSI management service. The NSSMF is a function for generating and managing network slice subnets forming a part of a network slice, and provides an NSSI management service.

The slice manager 92 may output to the configuration manager 76 a configuration management instruction related to the instantiation of the network slice. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In this embodiment, for example, the configuration manager 76 executes configuration management such as settings of the element group including the NFS in accordance with the configuration management instruction received from the life cycle manager 94 or the slice manager 92.

In this embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

In this case, for example, the SDN controller 74 may use segment routing technology (for example, segment routing IPV6 (SRv6)) to construct an NSI and NSSI for the server or an aggregation router present between communication routes. The SDN controller 74 may also generate an NSI and NSSI extending over a plurality of NEs to be set by issuing, to the plurality of NEs to be set, a command to set a common virtual local area network (VLAN) and a command to assign a bandwidth and a priority indicated by the setting information to the VLAN.

The SDN controller 74 may change the maximum value of the bandwidth that can be used for communication between two IP addresses without constructing a network slice.

The platform system 30 in this embodiment may include a plurality of SDN controllers 74. Each of the plurality of SDN controllers 74 may execute a process such as the creation of a communication route for a network device group including the AGs associated with the SDN controller 74.

In this embodiment, the monitor 72 monitors, for example, the element group included in the communication system 1 based on a given management policy. In this case, for example, the monitor 72 may monitor the element group based on a monitoring policy designated by the purchaser when the purchaser purchases the network service.

In this embodiment, the monitor 72 executes monitoring at various levels, such as a slice level, an NS level, an NF level, a CNFC level, and a level of hardware such as the server.

For example, the monitor 72 may set a module for outputting metric data in the hardware such as the server, or a software element included in the communication system 1 so that monitoring can be performed at the various levels described above. In this case, for example, the NF may output the metric data indicating a metric that can be measured (can be identified) by the NF to the monitor 72. Further, the server may output the metric data indicating a metric relating to the hardware that can be measured (can be identified) by the server to the monitor 72.

In addition, for example, the monitor 72 may deploy, in the server, a sidecar container for aggregating the metric data indicating the metrics output from a plurality of containers in units of CNFCs (microservices). This sidecar container may include an agent called "exporter." The monitor 72 may repeatedly execute a process for acquiring the metric data aggregated in units of microservices from the sidecar container, at predetermined monitoring intervals through use of a mechanism of a monitoring tool, for example, Prometheus capable of monitoring the container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

In this embodiment, for example, the monitor 72 executes a process (enrichment) for aggregating metric data in predetermined units of aggregation to generate performance index value data indicating the performance index values of the elements included in the communication system 1 in the units of aggregation.

For example, for one qNB, the metric data indicating the metrics of the elements under control of the qNB (for example, network nodes such as DUs 42 and CUs 44) is aggregated to generate the performance index value data of the qNB. In this way, performance index value data indicating a communication performance in the area covered by the gNB is generated. For example, performance index value data indicating a plurality of types of communication performance, such as throughput and latency, may be generated in each gNB. However, the communication performance indicated by the performance index value data is not limited to throughput and latency.

The monitor 72 outputs the performance index value data generated by the above-mentioned enrichment to the data bus 68.

In this embodiment, for example, the data bus 68 receives the performance index value data output from the monitor 72. Based on the received one or a plurality of pieces of performance index value data, the data bus 68 generates a performance index value file including the one or a plurality of pieces of performance index value data. The data bus 68 then outputs the generated performance index value file to the big-data platform 66.

Further, the elements such as the network slice, the NS, the NF, the CNFC that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file in which alert message data indicating one or a plurality of notifications are compiled into one file, and outputs the generated alert file to the big-data platform 66.

In this embodiment, the big-data platform 66 accumulates, for example, the performance index value file and the alert file that have been output from the data bus 68.

In this embodiment, for example, a plurality of trained machine learning models are stored in the AI 70 in advance. The AI 70 uses various machine learning models stored in the AI 70 to execute an estimation process such as a future prediction process for a use status quality of service of the communication system 1. The AI 70 may generate estimation result data indicating results of the estimation process.

The AI 70 may execute the estimation process based on the files accumulated in the big-data platform 66 and the above-mentioned machine learning model. This estimation process is suitable when prediction of a long-term trend is performed infrequently.

Further, the AI 70 can acquire performance index value data stored in the data bus 68. The AI 70 may execute the estimation process based on the performance index value data stored in the data bus 68 and the above-mentioned machine learning model. This estimation process is suitable when short-term predictions are performed frequently.

In this embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. Further, the performance manager 88 may acquire estimation result data from the AI 70. A performance index value such as a KPI may be calculated based on at least one of the performance index value file or the estimation result data. The performance manager 88 may directly acquire metric data from the monitor 72. Further, the performance index value such as a KPI may be calculated based on the metric data.

In this embodiment, the failure manager 86 detects the occurrence of a failure in the communication system 1 based on, for example, at least any one of the above-mentioned metric data, the above-mentioned notification of the alert, the above-mentioned estimation result data, or the above-mentioned Comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may directly acquire the metric data and the notification of the alert from the monitor 72. The failure manager 86 may also acquire the performance index value file and the alert file from the big-data platform 66. Further, the failure manager 86 may acquire the alert message data from the data bus 68.

In this embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. The policy manager 90 may also output an instruction for scaling or replacement of the elements to the life cycle manager 94 based on the result of the determination process.

The policy manager 90 in this embodiment can acquire the performance index value data stored in the data bus 68. The policy manager 90 may then execute a predetermined determination process based on the performance index value data acquired from the data bus 68. The policy manager 90 may also execute a predetermined determination process based on the alert message data stored in the data bus 68.

In this embodiment, for example, the management supporter 84 provides a function for supporting users as such an administrator of the communication system 1, for example, an administrator of the whole communication system 1 or an administrator of a network service purchased by a purchaser that is a part of the communication system 1.

In this case, the management supporter 84 may generate a ticket indicating information to be notified to the administrator of the communication system 1. The management supporter 84 may generate a ticket indicating details of the detection failure data. The management supporter 84 may also generate a ticket indicating a value of the performance index value data or the metric data. The management supporter 84 may also generate a ticket indicating a determination result obtained by the policy manager 90.

Then, the management supporter 84 notifies the administrator of the communication system 1 of the generated ticket. The management supporter 84 may send, for example, an email to which the generated ticket is attached to an email address of the administrator of the communication system 1.

Further, the management supporter 84 may generate a monitoring screen (dashboard screen), which is described later. The management supporter 84 may transmit the generated monitor screen to the purchaser terminal 36. The purchaser terminal 36 may display the transmitted monitoring screen on a display or the like.

Further, the management supporter 84 receives operations performed on the purchaser terminal 36 by users such as the administrator of the network service. For example, in response to an operation by the user on the purchaser terminal 36, the purchaser terminal 36 may transmit an operation signal representing the operation to the platform system 30. The management supporter 84 may then receive the operation signal.

[Execution of Process Based on Performance Index Value Data or Performance Index Value File]

Now, further description is given of generation of the performance index value file, a determination process based on the performance index value data stored in the data bus 68, and an estimation process based on the performance index value data stored in the data bus 68.

Figure 7:
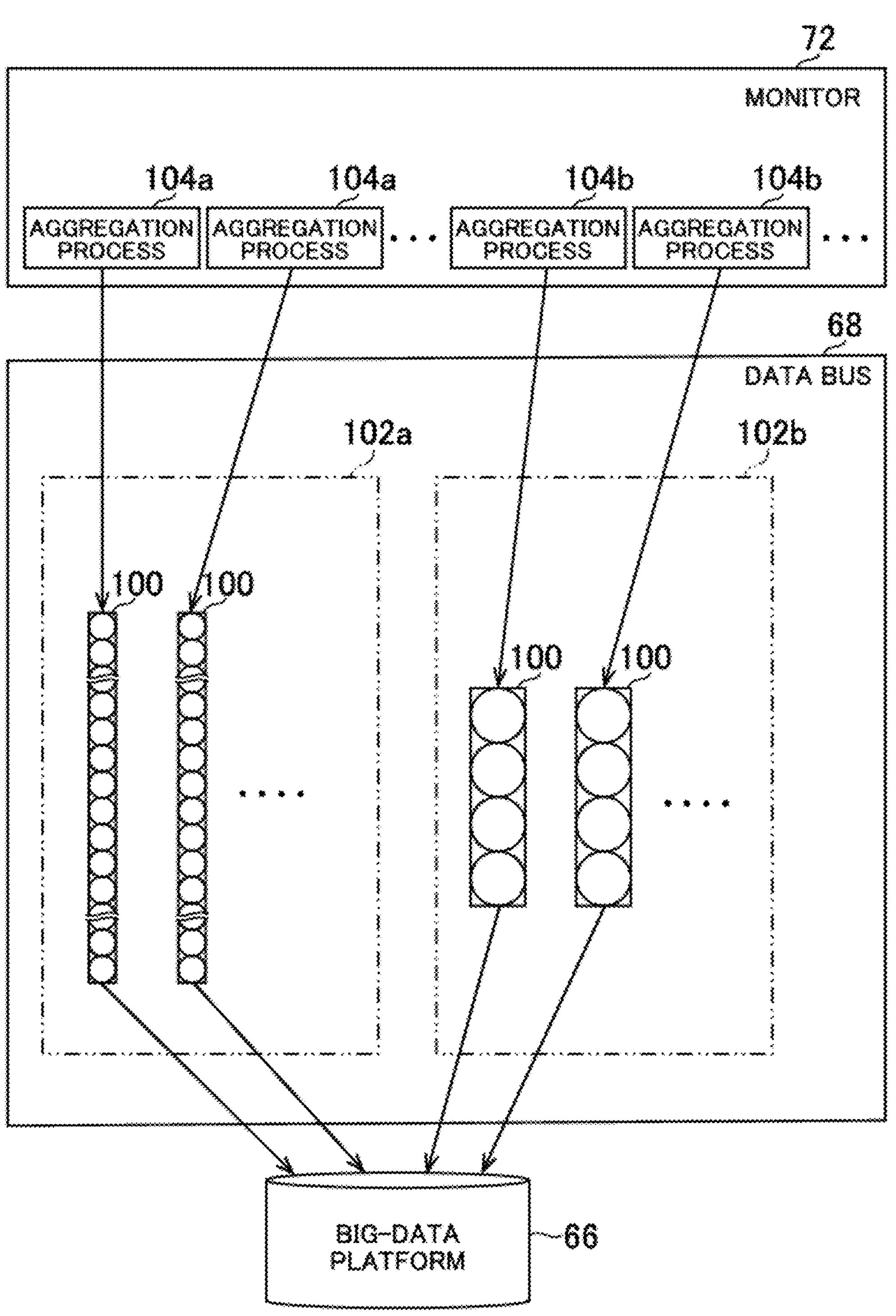
FIG. 7 is a diagram for schematically illustrating an example of a data bus in the one embodiment of the present invention.

FIG. 7 is a diagram for schematically illustrating an example of the data bus 68 in this embodiment. As illustrated in FIG. 7, the data bus 68 in this embodiment includes, for example, a plurality of queues 100 that hold performance index value data in a first-in, first-out list structure.

Each queue 100 belongs to any one of a first queue group 102*a* or a second queue group 102*b*.

In this embodiment, for example, a plurality of aggregation processes 104 are operating in the monitor 72. In each aggregation process 104, the elements to be aggregated in the aggregation process 104 are preset. The elements may be elements included in the RAN 32 or may be elements included in the core network system 34.

For example, in each aggregation process 104, the gNBs to be aggregated in the aggregation process 104 may be preset. Each aggregation process 104 may acquire metric data from the NEs (for example, RUs 40, DUs 42, and CU-UPs 44*b*) under the control of the gNBs to be aggregated in the aggregation process 104. Further, the aggregation process 104 may execute an enrichment process for generating performance index value data indicating the communication performance of the qNB based on the acquired metric data.

Further, for example, in each aggregation process 104, the NSes to be aggregated in the aggregation process 104 may be preset. For example, in each aggregation process 104, a UPF service including one or a plurality of UPFs 50 or an AMF service including one or a plurality of AMFs 46, which are the elements to be aggregated, may be preset. Each aggregation process 104 may acquire metric data from the NEs under the control of the NSes to be aggregated in the aggregation process 104. Further, the aggregation process 104 may execute an enrichment process for generating performance index value data indicating the communication performance of the NS based on the acquired metric data.

Further, in this embodiment, for example, the aggregation process 104 and the queue 100 are linked in advance. For convenience, in FIG. 7, a case in which the aggregation process 104 and the queue 100 are linked in a one-to-one relationship is illustrated, but the aggregation process 104 and the queue 100 may be linked in a many-to-many relationship.

The aggregation processes 104 linked to the queues 100 included in the first queue group 102*a* are hereinafter referred to as "first group aggregation processes 104*a*." Further, the aggregation processes 104 linked to the queues 100 included in the second queue group 102*b* are hereinafter: referred to as "second group aggregation processes 104*b*."

At predetermined time intervals (for example, every minute), each first group aggregation process 104*a* generates performance index value data by aggregating the metric data associated with the first group aggregation process 104*a* from the previous aggregation to the present time.

The first group aggregation process 104*a* acquires the metric data from one or a plurality of NEs associated with the first group aggregation process 104*a* at intervals of, for example, one minute. Then, the first group aggregation process 104*a* generates performance index value data for the aggregation period by aggregating the metric data for the same aggregation period.

Each time the first group aggregation process 104*a* generates performance index data, value the first group aggregation process 104*a* enqueues the performance index value data into one or a plurality of queues 100 linked to the first group aggregation process 104*a*.

At predetermined time intervals (for example, every fifteen minutes), each second group aggregation process 104*b* generates performance index value data by aggregating the metric data associated with the second group aggregation process 104*b* from the previous aggregation to the present time.

The second group aggregation process 104*b* acquires the metric data from one or a plurality of NEs associated with the second group aggregation process 104*b* at intervals of, for example, fifteen minutes. Then, the second group aggregation process 104*b* generates performance index value data for the aggregation period by aggregating the metric data for the same aggregation period.

Each time the second group aggregation process 104*b* generates performance index value data, the second group aggregation process 104*b* enqueues the performance index value data into one or a plurality of queues 100 linked to the second group aggregation process 104*b*.

In this embodiment, the maximum number of pieces of performance index value data that is storable in the queues 100 included in the first queue group 102*a* is determined in advance. In this case, for example, it is assumed that a maximum of 60 pieces of performance index value data is storable in the queues 100. That is, the maximum number is "60."

Further, in this embodiment, the maximum number of pieces of performance index value data that is storable in the queues 100 included in the second queue group 102*b* is determined in advance. In this case, for example, it is assumed that a maximum of four pieces of performance index value data is storable in the queues 100. That is, the maximum number is "4."

In this embodiment, for example, a plurality of determination processes 106 (see FIG. 8, FIG. 9, and FIG. 10) are operating in the policy manager 90. A part of those determination processes 106 execute determination processes based on the performance index value data stored in the data bus 68, and the rest of the determination processes 106 execute determination processes based on files stored in the big-data platform 66.

Among the determination processes 106 in this embodiment, there is a determination process 106 that acquires a performance index value file including one or a plurality of pieces of performance index value data. That determination process 106 determines the status of the communication system 1 based on the acquired performance index value file. In this case, for example, the status of the element included in the communication system 1 and associated with the determination process 106 may be determined. For example, the status of the element to be aggregated in the first group aggregation process 104*a* that has generated the performance index value data included in the performance index value file acquired by the determination process 106 may be determined. Such a determination process 106 is hereinafter referred to as "file determination process 106*a*."

In this embodiment, for example, the file determination process 106*a* and the queue 100 are linked in advance. For convenience, in FIG. 8, FIG. 9, and FIG. 10, there are illustrated cases in which the file determination process 106*a* and the queue 100 are linked in a one-to-one relationship, but the file determination process 106*a* and the queue 100 may be linked in a many-to-many relationship.

In this case, for example, in response to the performance index value file generated based on the performance index value data included in a queue 100 included in the first queue group 102*a* being output to the big-data platform 66, the data bus 68 may output a notification indicating that the performance index value file has been output to one or a plurality of file determination processes 106*a* linked to the queue 100.

When the file determination process 106*a* receives the notification, in response to the received notification, the file determination process 106*a* may acquire the performance index value file output to the big-data platform 66.

Further, among the determination processes 106 in this embodiment, there is a determination process 106 that acquires performance index value data indicating an actual result value of a performance index value relating to the communication system 1. For example, there is a determination process 106 that, in response to the enqueuing of performance index value data in a queue 100 included in the first queue group 102*a*, acquires that performance index value data.

In this embodiment, the queues 100 included in the first queue group 102*a* are configured so that the performance index value data can be accessed (acquired) without dequeuing any of the performance index value data included in the queue 100.

That determination process 106 determines the status of the communication system 1 based on the acquired performance index value data. In this case, for example, the status of the elements included in the communication system 1 and associated with the determination process 106 may be determined. For example, the status of the elements to be aggregated in the first group aggregation 104*a* process that has generated the performance index value data acquired by the determination process 106 may be determined. Such a determination process 106 is hereinafter referred to as "current status determination process 106*b*."

In this embodiment, for example, the current status determination process 106*b* and the queue 100 are linked in advance. For convenience, in FIG. 9 and FIG. 10, there are illustrated cases in which the current status determination process 106*b* and the queue 100 are linked in a one-to-one relationship, but the current status determination process 106*b* and the queue 100 may be linked in a many-to-many relationship.

In this case, for example, in response to the enqueuing of performance index value data in a queue 100 included in the first queue group 102*a*, the data bus 68 may output a notification indicating that the performance index value data has been enqueued to one or a plurality of current status determination processes 106*b* linked to the queue 100.

When the current status determination process 106*b* receives the notification, in response to the received notification, the current status determination process 106*b* may acquire the most recent performance index value data stored in the queue 100.

Figure 10:
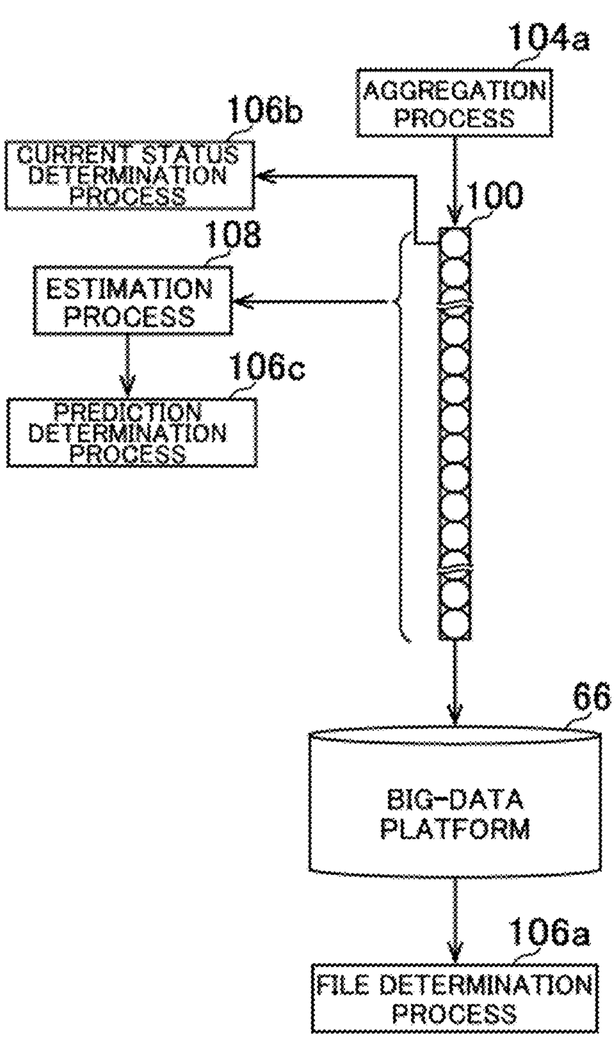
FIG. 10 is a diagram for schematically illustrating an example of acquisition of performance index value data by a current status determination process and an estimation process, and acquisition of a performance index value file by a file determination process.

Among the determination processes 106 in this embodiment, there is a determination process 106 that acquires estimation result data indicating an estimation result obtained by an estimation process 108 linked to the determination process 106 (see FIG. 10). That determination process 106 determines the status of the communication system 1 based on the acquired estimation result data. In this case, for example, the status of the element included in the communication system 1 and associated with the determination process 106 may be determined. For example, the status of the element to be aggregated in the first group aggregation process 104*a* that has generated the performance index value data acquired by the estimation process 108 may be determined. Such a determination process 106 is hereinafter referred to as "prediction determination process 106*c*."

Further, in this embodiment, for example, a plurality of estimation processes 108 (see FIG. 10) are operating in the AI 70. A part of those estimation processes 108 execute estimation processes based on the performance index value data stored in the data bus 68, and the rest of the estimation processes 108 execute estimation processes based on files stored in the big-data platform 66.

Further, in this embodiment, for example, the estimation process 108 and the queue 100 are linked in advance. For convenience, in FIG. 10, a case in which the estimation process 108 and the queue 100 are linked in a one-to-one relationship is illustrated, but the estimation process 108 and the queue 100 may be linked in a many-to-many relationship.

In this embodiment, for example, each estimation process 108 acquires the performance index value data stored in the queue 100 which corresponds to the estimation process 108 and which is included in the first queue group 102*a*. The estimation processes execute the estimation process determined in advance for the relevant estimation process 108 based on the performance index value data.

In this case, for example, in response to performance index value data being enqueued in a queue 100 included in the first queue group 102*a*, the estimation process 108 acquires a predetermined number of most recent pieces of the performance index value data or the performance index value data of a most recent predetermined period including at least the latest performance index value data among the performance index value data stored in the queue 100.

In this case, for example, in response to performance index value data being enqueued in a queue 100 included in the first queue group 102*a*, the data bus 68 may output a notification indicating that the performance index value data has been enqueued to one or a plurality of estimation processes 108 linked to the queue 100.

When the estimation process 108 receives the notification, in response to the received notification, the estimation process 108 may acquire a predetermined number of most recent pieces of the performance index value data or the performance index value data of a most recent predetermined period including at least the latest performance index value data among the performance index value data stored in the queue 100.

In this case, for example, the estimation process 108 illustrated in FIG. 10 acquires 60 pieces of performance index value data, including the latest performance index value data. Those pieces of performance index value data correspond to the most recent 60 minutes of performance index value data, including the latest performance index value data. The estimation process 108 then executes the estimation process based on the acquired performance index value data.

For example, it is assumed that the first group aggregation process 104*a* associated with a specific gNB generates performance index value data relating to the qNB by aggregating the metric data associated with the elements included in the gNB (for example, elements under the control of the qNB). It is also assumed that, in response to the enqueuing of the performance index value data in the queue 100, the estimation process 108 that acquires the performance index value data generated by the first group aggregation process 104*a* acquires 60 pieces of performance index value data, including the most recent piece of performance index value data, stored in the queue 100.

In this case, the estimation process 108 uses a trained machine learning model stored in advance in the AI 70 to predict a communication performance such as the network load level of the qNB from the current time to 20 minutes after the current time based on the 60 pieces of performance index value data. For example, the estimation process 108 may predict the throughput, latency, and the like as the network load level of the gNB.

The machine learning model may be, for example, an existing prediction model. Further, for example, the machine learning model may be a trained machine learning model in which supervised learning using a plurality of training data elements has been executed in advance. Each of those plurality of training data elements may include, for example, for given time points different from each other, learning input data indicating the throughput in the gNB for 60 minutes until the time point and teacher data indicating the network load level (for example, throughput or latency) in the gNB from the time point until 20 minutes after the time point.

Further, for example, the first group aggregation process 104*a* associated with a specific NS (for example, UPF service or AMF service) may generate the performance index value data relating to the element. Further, in response to the enqueuing of the performance index value data in the queue 100, the estimation process 108 that acquires the performance index value data generated by the first group aggregation process 104*a* may acquire 60 pieces of performance index value data, including the most recent piece of performance index value data, stored in the queue 100.

In this case, the estimation process 108 uses a trained machine learning model stored in advance in the AI 70 to predict a communication performance such as the network load level of the element from the current time to 20 minutes after the current time based on the 60 pieces of performance index value data. For example, the estimation process 108 may predict the throughput, latency, and the like as the network load level of the element.

The machine learning model may be, for example, an existing prediction model. Further, for example, the machine learning model may be a trained machine learning model in which supervised learning using a plurality of training data elements has been executed in advance. Each of those plurality of training data elements may include, for example, for given time points different from each other, learning input data indicating the throughput in the NS for 60 minutes until the time point and teacher data indicating the network load level (for example, throughput or latency) in the NS from the time point until 20 minutes after the time point.

The estimation process 108 is not required to acquire all of the pieces of the performance index value data stored in the queue 100 as described above, and may acquire some of the pieces of the performance index value data stored in the queue 100.

The estimation process 108 outputs estimation result data indicating the execution result (estimation result) of the estimation process to the prediction determination process 106*c* linked to the estimation process 108. The prediction determination process 106*c* then acquires the estimation result data. Then, the prediction determination process 106*c* determines the status of the communication system 1 based on the acquired estimation result data.

As described above, the aggregation process 104, the file determination process 106*a*, the current status determination process 106*b*, the prediction determination process 106*c*, and the estimation process 108 are linked to the queue 100 in this embodiment.

Further, in this embodiment, for example, the data bus 68 generates a performance index value file including at least a part of the performance index value data stored in the queue 100 at a frequency lower than the frequency at which the AI 70 acquires the performance index value data.

For example, the data bus 68 may generate, at predetermined time intervals, a performance index value file including the performance index value data stored in the queue 100 after a previous timing of generation of the performance index value file.

In this case, the time interval may or may not match the time corresponding to the maximum number of pieces of performance index value data that is storable in the queues 100 included in the first queue group 102*a*.

Further, for example, the data bus 68 may generate a file including all the performance index value data stored in the queue 100 in response to dequeuing of all the performance index value data included in the generated performance index value file. That is, the file including all the performance index value data stored in the queue 100 may be generated in response to the replacement of all the performance index value data stored in the queue 100.

Further, in this embodiment, in a case in which 60 pieces of performance index value data are stored in a queue 100 included in the first queue group 102*a*, when new performance index value data is enqueued, the oldest performance index value data stored in the queue 100 is dequeued. That is, the oldest performance index value data stored in the queue 100 is erased from the queue 100.

In this embodiment, when four pieces of performance index value data are stored in a queue 100 included in the second queue group 102*b*, the data bus 68 generates a performance index value file in which those four pieces of performance index value data are consolidated into one file. The data bus 68 then outputs the generated performance index value file to the big-data platform 66.

The data bus 68 dequeues all the performance index value data stored in the queue 100. That is, all the performance index value data stored in the queue 100 is erased from the queue 100.

In this way, the process executed in response to the generation of the performance index value file is different for the queues 100 included in the first queue group 102*a* from that for the queues 100 included in the second queue group 102*b*. For the queues 100 included in the second queue group 102*b*, all the performance index value data stored in a queue 100 is erased from the queue 100 in response to the generation of the performance index value file. Meanwhile, for the queues 100 included in the first queue group 102*a*, dequeuing in response to the generation of the performance index value file is not executed.

In the following description, it is assumed that the performance index value file is generated at intervals of 60 minutes. That is, one performance index value file includes the performance index value data for the most recent 60 minutes.

[Selection of Options Relating to Monitoring Setting]

Further, in this embodiment, for example, the purchaser of a network service can select options relating to a monitoring setting when purchasing the network service. In the following description, it is assumed that the purchaser of the network service can select any one of the following options: a low-level option, a medium-level option, and a high-level option.

Figure 8:
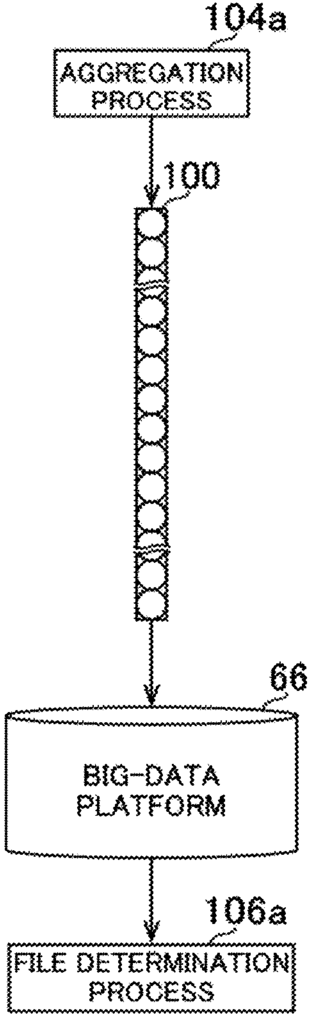
FIG. 8 is a diagram for schematically illustrating an example of acquisition of a performance index value file by a file determination process.

For example, in a case in which the low-level option is selected, when the network service is constructed, not only the element included in the network service, but as illustrated in FIG. 8, a queue 100 linked to the element and an aggregation process 104 linked to the element are also generated. In this case, performance index value files relating to the element included in the network service are accumulated in the big-data platform 66.

A file determination process 106*a* linked to the queue 100 is also generated. At this time, the policy manager 90 may refer to the inventory data to confirm the attributes of the element associated with the generated file determination process 106*a*. The policy manager 90 may generate a file determination process 106*a* in which a workflow corresponding to the confirmed attributes is set. Then, the file determination process 106*a* may execute the determination process by executing the workflow set in the file determination process 106*a*.

For example, the file determination process 106*a* may determine whether or not to execute an action (for example, whether or not to execute scale-out) based on the acquired performance index value file.

In addition, in this embodiment, for example, as described above, the platform system 30 may execute scale-out of the element determined based on the performance index value file in response to a determination that scale-out is required. For example, the policy manager 90, the life cycle manager 94, the container manager 78, and the configuration manager 76 may cooperate with each other to execute scale-out.

Figure 9:
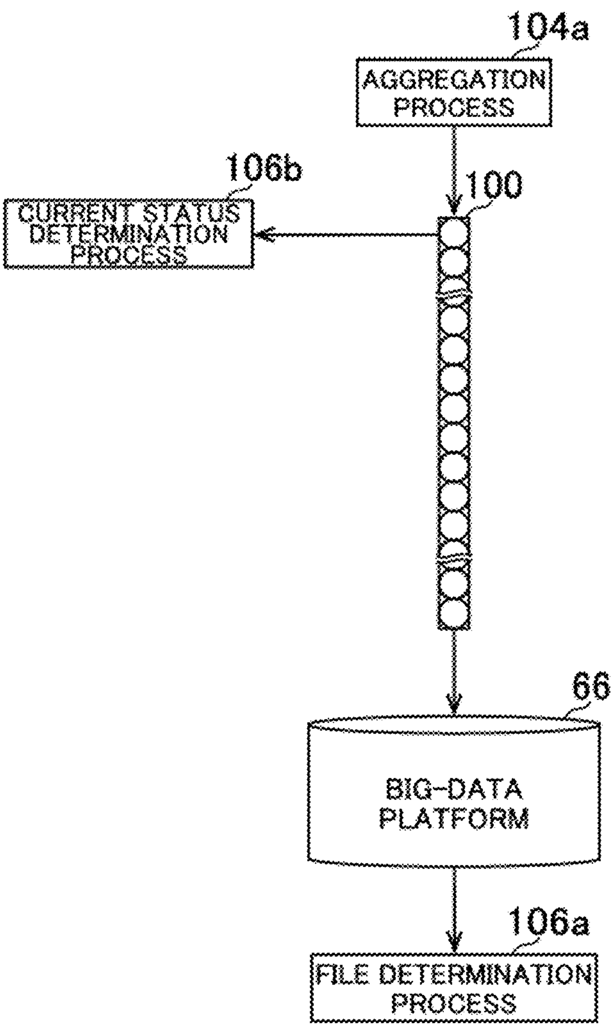
FIG. 9 is a diagram for schematically illustrating an example of acquisition of performance index value data by a current status determination process and acquisition of a performance index value file by a file determination process.

Further, for example, in a case in which the medium-level option is selected, when the network service is constructed, not only the element included in the network service, but like the low-level option, a queue 100 linked to the element, an aggregation process 104 linked to the element, and a file determination process 106*a* linked to the queue 100 are also generated. In addition, as illustrated in FIG. 9, a current status determination process 106*b* linked to the queue 100 is also generated.

At this time, the policy manager 90 may refer to the inventory data to confirm the attributes of the elements associated with the generated current status determination process 106*b*. The policy manager 90 may generate a current status determination process 106*b* in which a workflow corresponding to the confirmed attributes is set. Then, the current status determination process 106*b* may execute the determination process by executing the workflow set in the current status determination process 106*b*.

For example, the current status determination process 106*b* may determine whether or not to execute an action (for example, whether or not to execute scale-out) based on the acquired performance index value data.

In addition, in this embodiment, for example, as described above, the platform system 30 may execute scale-out of the element determined based on the performance index value data in response to a determination that scale-out is required.

Further, for example, in a case in which the high-level option is selected, when the network service is constructed, not only the element included in the network service, but like the low-level option and the medium-level option, a queue 100 linked to the element, an aggregation process 104 linked to those elements, a file determination process 106*a* linked to the queue 100, and a current status determination process 106*b* linked to the queue 100 are generated.

Further, as illustrated in FIG. 10, the AI 70 generates an estimation process 108 linked to current the status determination process 106*b*, and the policy manager 90 generates a prediction determination process 106*c* linked to the current status determination process 106*b*. In this case, for example, the estimation process 108 and the prediction determination process 106*c* may be activated. Moreover, at this time, instantiation of a trained machine learning model may also be executed. The estimation process 108 may then execute estimation using the machine learning model instantiated in this way.

The prediction determination process 106*c* may execute a predetermined determination process based on the estimation result data output by the estimation process 108 linked to the prediction determination process 106*c*. For example, the prediction determination process 106*c* may determine whether to execute an action (for example, whether to execute scale-out) based on the network load prediction result.

In this embodiment, for example, as illustrated in FIG. 9, in response to the enqueuing of performance index value data in a queue 100 included in the first queue group 102*a*, the current status determination process 106*b* may acquire the enqueued performance index value data, and the estimation process 108 may acquire a predetermined number of most recent pieces of the performance index value or the performance index value of a most recent predetermined period including at least the enqueued performance index value data among the performance index value data stored in the queue 100. In this way, in response to the enqueuing of performance index value data in a queue 100, the enqueued performance index value data may be acquired by both the current status determination process 106*b* and the estimation process 108.

The current status determination process 106*b* may then determine whether or not to execute an action (for example, whether or not to execute scale-out) based on the acquired performance index value data.

In addition, the estimation process 108 may generate estimation result data indicating a prediction result of a communication performance such as a network load based on the acquired performance index value data. The estimation process 108 may then output the generated estimation result data to the prediction determination process 106*c*. The prediction determination process 106*c* may acquire the estimation result data.

Further, the prediction determination process 106*c* may determine whether or not to execute an action (for example, whether or not to execute scale-out) based on the acquired estimation result data.

It is not required that the AI 70 generate the estimation process 108 and that the policy manager generate the prediction determination process 106*c*. For example, the current status determination process 106*b* may generate the estimation process 108 and the policy manager 90.

In this embodiment, for example, as described above, in response to a determination that scale-out is required, the platform system 30 may execute scale-out of the element determined based on the performance index value data or the estimation result data.

The operation of the above-mentioned network service performed when the low-level option is selected is hereinafter referred to as "operation based on the low-level option." Further, the operation of the above-mentioned network service performed when the medium-level option is selected is hereinafter referred to as "operation based on the medium-level option," and the operation of the above-mentioned network service performed when the high-level option is selected is hereinafter referred to as "operation based on the high-level option."

In this embodiment, the purchaser of the network service may be able to select the option relating to the monitoring setting for each of the plurality of elements included in the network service.

For example, in this embodiment, the purchaser of the network service may be able to specify the elements to be included in the communication system 1 when the medium-level option is selected. The file determination process 106*a* and the current status determination process 106*b* may then be generated for the specified elements. In this way, operation based on the medium-level option may be performed for only the portion of the elements that are included in the network service. For the remaining elements, operation based on the low-level option may be performed.

Further, in this embodiment, the purchaser of the network service may be able to specify the elements included in the communication system 1 when the high-level option is selected. The file determination process 106*a*, the current status determination process 106*b*, the estimation process 108, and the prediction determination process 106*c* may then be generated for the specified elements. In this way, operation based on the high-level option may be performed for only the portion of the elements that are included in the network service. For the remaining elements, operation based on the low-level option or based on the medium-level option may be performed.

Further, when the medium-level option is selected, the file determination process 106*a* may not be generated. Moreover, when the high-level option is selected, the file determination process 106*a* and the current status determination process 106*b* may not be generated. In addition, the option relating to the monitoring setting may be changeable in accordance with a request by the purchaser.

[Change of Action Execution Condition]

In this embodiment, the management supporter 84 may provide performance information indicating the performance index value of an element included in the communication system 1. For example, the management supporter 84 may provide, to the user, performance information indicating the performance index value of an element included in the communication system 1. In this case, the management supporter 84 may provide performance information on a plurality of elements included in the communication system 1 to the user.

Figure 11:
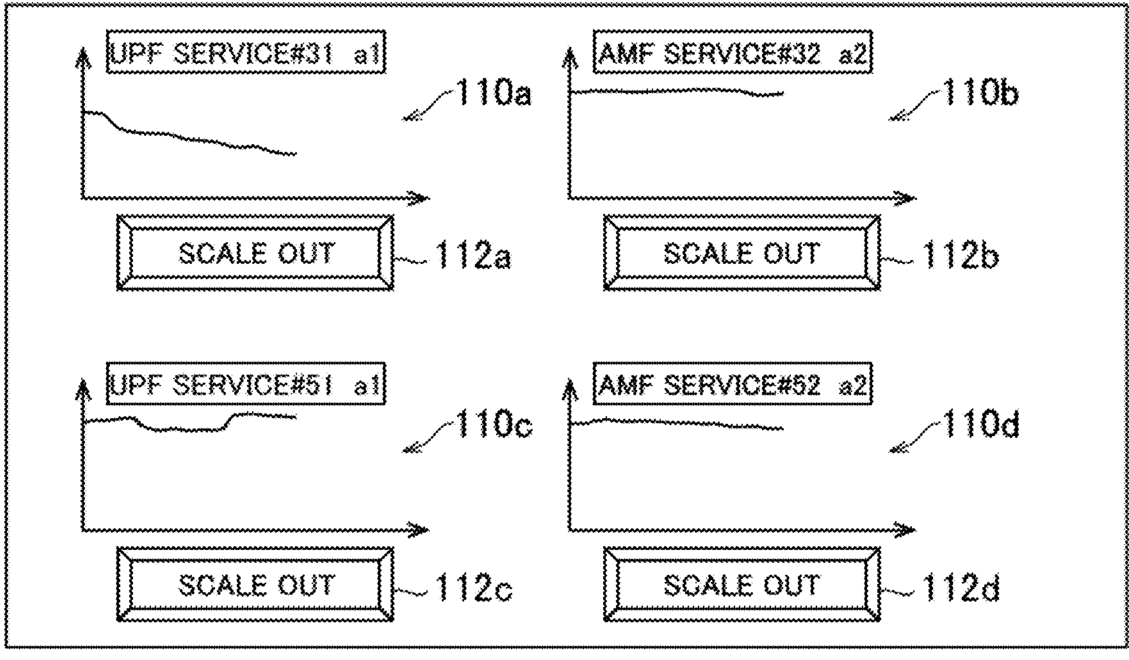
FIG. 11 is a diagram for illustrating an example of a monitoring screen.

For example, as described above, the management supporter 84 may generate the monitoring screen (dashboard screen) exemplified in FIG. 11. A plurality of performance information images 110 (110*a*, 110*b*, 110*c*, and 110*d*) are arranged on the monitoring screen illustrated in FIG. 11. Each performance information image 110 is associated with a combination of an element included in the communication system 1 and a type of the performance information on the element.

For example, the performance information image 110*a* shows performance information indicating a trend of a type a1 performance index value relating to a UPF service having the identifier #31. The performance information image 110*b* shows performance information indicating a trend of a type a2 performance index value relating to an AMF service having the identifier #32. The performance information image 110*c* shows performance information indicating a trend of a type a1 performance index value relating to a UPF service having the identifier #51. The performance information image 110*d* shows performance information indicating a trend of a type a2 performance index value relating to an AMF service having the identifier #52. In this way, each performance information image 110 shows the performance index value of an element included in the communication system 1 for at least one time point.

As illustrated in FIG. 11, the monitoring screen may display performance information indicating the same type of performance index value for a plurality of mutually different elements. Moreover, the monitoring screen may display a plurality of types of performance information for one element. That is, a plurality of performance information images 110 each showing a different type of performance information relating to one element may be arranged on the monitoring screen.

Further, in this embodiment, for example, the user such as an administrator of the network service purchased by the purchaser can perform an operation of specifying, from among the plurality of elements included in the communication system 1, an element having performance information arranged on the monitoring screen and the type of the performance index value indicated by the performance information. In this case, for example, the user can perform an operation of specifying one or a plurality of elements from among the plurality of elements included in the network service purchased by the purchaser.

Further, the management supporter 84 receives the specification of the one or a plurality of elements from among the plurality of elements included in the communication system 1 from the purchaser terminal 36. For example, the management supporter 84 receives an operation signal indicating the specified one or a plurality of elements and the type of the performance index value transmitted from the purchaser terminal 36 in response to the above-mentioned specification operation.

The management supporter 84 displays a monitoring screen showing the performance information on the specified one or a plurality of elements on a display or the like of the purchaser terminal 36. For example, the management supporter 84 generates a monitoring screen showing the performance information on the specified one or a plurality of elements, and transmits the monitoring screen to the purchaser terminal 36. Then, the purchaser terminal 36 displays the monitoring screen on a display or the like.

Further, in this embodiment, for example, the management supporter 84 repeatedly updates the displayed monitoring screen. For example, the management supporter 84 may update the displayed monitoring screen to show the latest performance information at predetermined time intervals. In addition, for example, the displayed monitoring screen may be updated to show the latest performance information every time a new performance index value file corresponding to the performance information displayed on the monitoring screen is output to the big-data platform 66.

In this embodiment, when the user specifies a plurality of elements, the user may also be able to specify the arrangement of the performance information of each of the elements specified by the user in the monitoring screen. For example, the user may be able to specify the position of the performance information image 110 of each element, or may specify the order in which the performance information image 110 of each element is arranged. In this case, an operation signal indicating the arrangement of each element is also transmitted from the purchaser terminal 36 to the management supporter 84.

Further, the management supporter 84 may receive from the user the specification of the arrangement of the performance information of each of the specified elements within the monitoring screen. The management supporter 84 may then generate a monitoring screen showing the performance information of each of the plurality of specified elements in accordance with the specified arrangement. The management supporter 84 may then display the generated monitoring screen on the display or the like of the purchaser terminal 36.

Further, in this embodiment, for example, as illustrated in FIG. 11, a plurality of action execution buttons are arranged on the monitoring screen. Each action execution button is associated with a performance information image 110.

Each action execution button is a button for executing a given action on the element associated with the action execution button. In FIG. 11, scale-out buttons 112 (112, 112*b*, 112*c*, and 112*d*) for executing scale-out are arranged as an example of the action execution buttons.

In the example of FIG. 11, the scale-out buttons 112 associated with the performance information images 110 are arranged below the performance information images 110. For example, the scale-out button 112*a*, the scale-out button 112*b*, the scale-out button 112*c*, and the scale-out button 112*d* are arranged below the performance information image 110*a*, the performance information image 110*b*, the performance information image 110*c*, and the performance information image 110*d*, respectively.

In this embodiment, for example, when the performance index value of an element included in the communication system 1 satisfies a given action execution condition, the platform system 30 executes an action on the element. For example, the platform system 30 executes scale-out of the NEs included in a certain NS in response to the NS satisfying a given scale-out execution condition.

The action that is executed in response to satisfaction of the action execution condition (in the above-mentioned example, the execution of scale-out that is executed in response to satisfaction of scale-out the execution condition) is hereinafter referred to as "conditional action."

Further, in this embodiment, for example, the platform system 30 executes the action on the element in response to an instruction to execute the action on the element received in a situation in which the performance index value of an element included in the communication system 1 does not satisfy the above-mentioned action execution condition. For example, the platform system 30 executes the action on the element in response to an instruction to execute the action on the element received from a user to whom the performance information on the element is being provided in a situation in which the performance index value of an element included in the communication system 1 does not satisfy the above-mentioned action execution condition.

For example, in response to the user such as an administrator performing a predetermined operation (for example, a click operation) on a scale-out button 112, the platform system 30 executes scale-out of the NFs included in the NS associated with that scale-out button 112. For example, in response to a predetermined operation being performed on a scale-out button 112, the platform system 30 executes scale-out of the NEs included in the NS for which performance information is shown in the performance information image 110 associated with the scale-out button 112.

The action executed in response to an instruction by the user (in the above-mentioned example, the scale-out executed in response to a click operation on the scale-out button 112) is hereinafter referred to as "instructed action."

In this embodiment, for example, when the reception status of the instruction to execute the action on the element received from the user satisfies a given change condition, the policy manager 90 changes the action execution condition to a condition determined based on the reception status of the execution instruction. Further, after the action execution condition is changed, the platform system 30 executes the action on the element in response to the performance index value of the element satisfying the changed action execution condition.

For example, it is assumed that the given change condition is the condition "an instruction to execute the action has been received a predetermined number of times (for example, three times) in the most recent predetermined period (for example, three days)." In this case, the action execution condition may be changed when the instruction to execute the action has been received the predetermined number of times in the most recent predetermined period.

In this case, when the reception status of the instruction to execute the action on any one of a plurality of elements satisfies the given change condition, the policy manager 90 may change the action execution condition of the any one of the plurality of elements to a condition determined based on the reception status of the execution instruction. For example, when the execution status of a predetermined operation on the scale-out button 112*a* satisfies a given change condition, the policy manager 90 may change the scale-out execution condition of the UPF service having the identifier #31 to a condition determined based on the reception status of the execution instruction.

As a result, the action execution condition set for any specific element among the plurality of elements is changed.

After the action execution condition of the element is changed, the platform system 30 may execute the action on the element in response to the performance index value of the element satisfying the changed action execution condition.

Now, an example of changing the action execution condition is described by focusing on the UPF service having the identifier #31.

For example, it is assumed that a low-level option has been selected by the purchaser of the network service, and the file determination process 106*a* determines whether or not the UPFs 50 included in the UPF service are required to be scaled out based on the performance index value file every time a performance index value file including the performance index value data of the UPF service is output to the big-data platform 66.

In this case, for example, it is assumed that the performance index value file shows the type a1 performance index values for each minute in a 60 minute period for the UPF service having the identifier #31. Further, in this case, it is assumed that the type a1 performance index values are performance index values that become smaller as the communication quality becomes lower.

Moreover, for example, it is assumed that the UPFs 50 included in the UPF service are being scaled out in response to a determination that the average value of the performance index values has fallen below a predetermined threshold value. For example, UPF 50 included in the UPF service have been added. The execution of the scale-out corresponds to execution of the conditional action described above.

In this case, it is assumed that the user clicks the scale-out button 112*a* even though the average value of the performance index values has not fallen below the predetermined threshold value, and scale-out of the UPFs 50 included in the UPF service is executed. The execution of the scale-out corresponds to execution of the instructed action described above.

In this case, the policy manager 90 may change the threshold value in response to the execution status of the instructed action satisfying a predetermined change condition.

In this case, the policy manager 90 may change the action execution condition for the UPF service to a condition determined based on the performance index value at the timing when the instruction to execute the action is received.

For example, when the threshold value is a value th1, and the performance index value for a type a1 UPF service at the timing when the scale-out button 112*a* was most recently clicked is v1, in this case, the threshold value may be changed from the value th1 to the value v1.

As a result, the performance index value at the timing when the user instructs that the action is to be executed is reflected in the changed action execution condition.

Further, in this case, the policy manager 90 may change the action execution condition to a condition determined based on the performance index value at the timing when the instruction to execute the action is received and the action execution condition at that timing.

For example, when, as described above, the threshold value is the value th1 and the performance index value for the type a1 UPF service at the timing when the scale-out button 112*a* was most recently clicked is v2, in this case, the threshold value may be changed from the value th1 to the average value of the value th1 and the value v2.

In this way, the action execution condition before the change and the performance index value at the timing when the user instructs the action to be executed are reflected in the changed action execution condition.

Further, the policy manager 90 may change the action execution condition to a condition determined based on the performance index value at each of a plurality of timings at which the instruction to execute the action is received. For example, the action execution condition may be changed to a condition determined based on the performance index value at each of a plurality of the most recent timings at which the instruction to execute the action is received.

For example, it is assumed that the given change condition is the condition "an instruction to execute scale-out has been received three times in the most recent three days." In this case, it is assumed that the instructed action has been executed three times in the most recent three days in a situation in which the average value of the performance index values has not fallen below a predetermined threshold value.

In this situation, for example, when the threshold value is the value th1, and the performance index values for the type a1 UPF service at the three most recent times the scale-out button 112*a* was clicked are v3, v4, and v5, in this case, the threshold value may be changed from the value th1 to the average value of the values v3, 4, and v5.

As a result, the performance index values at the plurality of timings at which the user instructs the action to be executed are reflected in the changed action execution condition.

As another example, in this situation, the above-mentioned threshold value may be changed from the value th1 to the average value of the value th1 and the values v3, v4, and v5. In this way, the policy manager 90 may change the action execution condition to a condition determined based on the performance index value at each of a plurality of timings at which the instruction to execute the action is received and the action execution condition at a final timing among those plurality of timings.

As a result, the action execution condition before the change and the performance index values at the plurality of timings at which the user instructs the action to be executed are reflected in the changed action execution condition.

The changing of the action execution condition is not limited to changing the threshold value. For example, in a case in which the action execution condition is the condition "it is determined that the average value of the performance index values indicated by the performance index value file has fallen below a predetermined threshold value three times in succession," in this case, the action execution condition may be changed to the condition "it is determined that the average value of the performance index values indicated by the performance index value file has fallen below a predetermined threshold value one time" when the reception status of the instruction to execute the instructed action satisfies a given change condition. In this way, for an action execution condition relating to the number of times a given condition is satisfied in succession, the number of times may be changed.

As another example, suppose a case in which the action execution condition is the condition "it is determined that the average value of the performance index values indicated by the performance index value file has fallen below a predetermined threshold value continuously for a period of three hours." In this case, the action execution condition may be changed to the condition "it is determined that the average value of the performance index values indicated by the performance index value file has fallen below a predetermined threshold value continuously for a period of one hour" when the reception status of the instruction to execute the instructed action satisfies a given change condition. In this way, for an action execution condition relating to the length of time for which a given condition is satisfied continuously, the length of time may be changed.

Further, in this embodiment, the policy manager 90 may start to execute the determination process based on the performance index value of the element when the reception status of the execution instruction satisfies the change condition described above. After the action execution condition is changed, the platform system 30 may execute the action on the element in response to a determination in the determination process that the changed action execution condition is satisfied.

In this case, when the reception status of the execution instruction satisfies the change condition described above, the policy manager 90 may start to execute the determination process for determining whether or not the current performance index value of the element satisfies the changed action execution condition at a higher frequency than before the reception status of the execution instruction satisfies the change condition.

In this way, it is possible to execute the action on the element in a more timely manner than before the action execution condition is changed.

For example, during operation based on the low-level option, when the reception status of the execution instruction for the UPF service having the identifier #31 satisfies the change condition described above, the operation of the UPF service may be changed to operation based on the medium-level option. In this case, the policy manager 90 may generate the current status determination process 106*b* associated with the UPF service. Then, the current status determination process 106*b* may start the determination process as to whether scaling out of the UPFs 50 included in the UPF service is required.

Further, in response to the enqueuing of performance index value data in the queue 100 associated with the UPF service, the current status determination process 106*b* may determine whether scaling out of the UPFs 50 included in the UPF service is required based on the performance index value data. When it is determined that scale-out is required, the UPFs 50 included in the UPF service may be scaled out.

For example, suppose a case in which the action execution condition is the condition "it is determined that the average value of the performance index values indicated by the performance index value file has fallen below a predetermined threshold value." In this case, the action execution condition may be changed to the condition "it is determined that the performance index value indicated by the latest performance index value data has fallen below a predetermined threshold value" when the reception status of the instruction to execute the instructed action satisfies a given change condition. In this way, it is determined whether or not the performance index value of the UPF service satisfies the changed action execution condition at a higher frequency than before the reception status of the execution instruction satisfies the change condition.

In addition, the policy manager 90 may start to execute the determination process for determining whether or not a predicted value of the performance index value of the element satisfies the changed action execution condition when the reception status of the execution instruction satisfies the change condition described above.

As a result, the predicted value can be used to determine whether or not the action execution condition is satisfied, thus enabling a more proactive action to be executed.

For example, during operation based on the low-level option or the medium-level option, when the reception status of the execution instruction for the UPF service having the identifier #31 satisfies the change condition described above, the operation of the UPF service may be changed to operation based on the high-level option. In this case, in the case of operation based on the low-level option, the policy manager 90 may generate the current status determination process 106*b*, the prediction determination process 106*c*, and the estimation process 108 associated with the UPF service. Further, in the case of operation based on the medium-level option, the policy manager 90 may generate the prediction determination process 106*c* and the estimation process 108 associated with the UPF service. Then, the output of the estimation result data by the estimation process 108 and the determination process as to whether scaling out of the UPFs 50 included in the UPF service is required based on the estimation result data by the prediction determination process 106*c* may be started. Further, in response to a determination that scaling out is required, the UPFs 50 included in the UPF service may be scaled out.

For example, in a case in which the action execution condition is the condition "it is determined that the average value of the performance index values indicated by the performance index value file has fallen below a predetermined threshold value," in this case, the action execution condition may be changed to the condition "it is determined that the predicted value of the performance index value data 20 minutes later falls below a predetermined threshold value" when the reception status of the instruction to execute the instructed action satisfies a given change condition. In this way, it is determined whether or not the current performance index value of the UPFs 50 satisfies the changed action execution condition at a higher frequency than before the reception status of the execution instruction satisfies the change condition.

Further, when the reception status of the execution instruction satisfies a first change condition, the policy manager 90 may start executing a determination process for determining whether or not the current performance index value of the element satisfies the changed action execution condition at a higher frequency than before the reception status of the execution instruction satisfies the first change condition, and when the reception status of the execution instruction satisfies a second change condition, the policy manager 90 may start executing the determination process for determining whether or not the predicted value of the performance index value of the element satisfies the changed action execution condition.

In this way, it is possible to start executing determination process suited to the reception status of the instruction to execute the action.

For example, it is assumed that, during operation based on the low-level option, the reception status of the execution instruction satisfies the change condition. In this case, when the performance index value of the UPF service at the timing when the scale-out button 112*a* is clicked is less than a value v6, the operation of the UPF service may be changed to operation based on the medium-level option. In addition, when the performance index value of the UPF service at the timing when the scale-out button 112*a* is clicked is equal to or more than the value v6, the operation of the UPF service may be changed to operation based on the high-level option.

Further, when the operation of the UPF service is changed to operation based on the medium-level option or operation based on the high-level option, the management supporter 84 may shorten the update interval of the monitoring screen. For example, the update interval of the monitoring screen may be shortened from 60 minutes to 1 minute. As another example, the update interval of the performance information image 110*a* arranged on the monitoring screen may be shortened from 60 minutes to 1 minute. When the update interval of the monitoring screen is shortened from 60 minutes to 1 minute, the performance information image 110*a* may be updated every time the monitoring screen is updated, and the remaining performance information images 110 may be updated every 60 updates of the monitoring screen.

Figure 12:
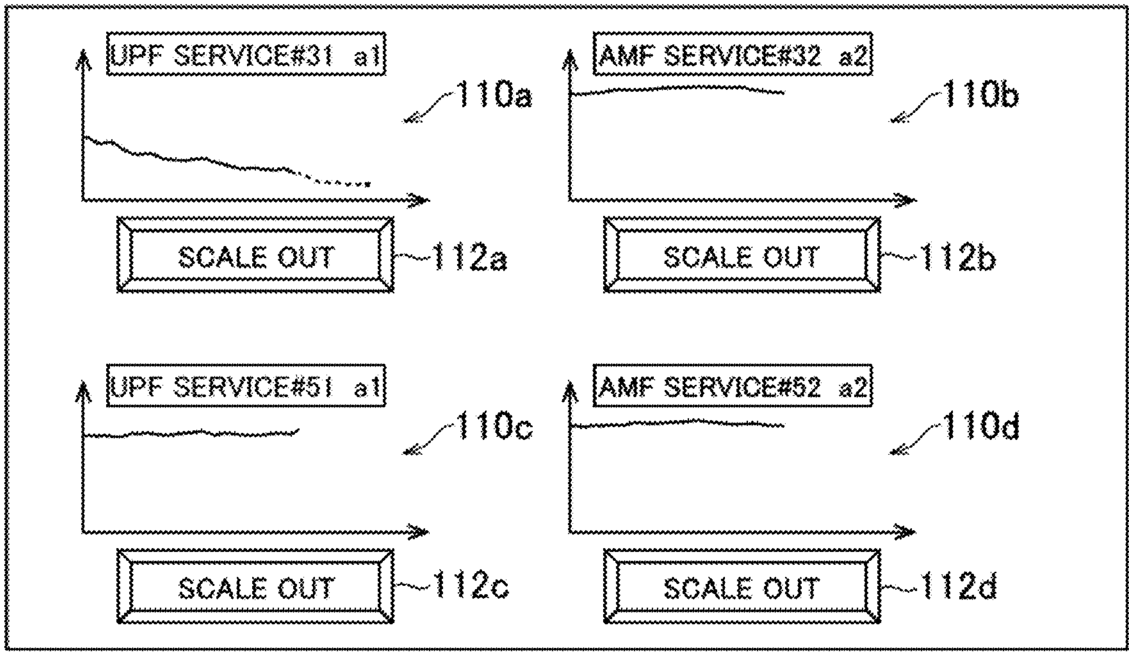
FIG. 12 is a diagram for illustrating an example of a monitoring screen.

Further, when the operation of the UPF service is changed to operation based on the high-level option, the management supporter 84 may start displaying the predicted value of the performance index value. For example, as illustrated in FIG. 12, the management supporter 84 may start generating a monitoring screen in which a performance information image 110*a* showing the predicted value of the performance index value for the type a1 UPF service is arranged.

Further, the management supporter 84 may notify, in response to the reception status of the instruction to execute the instructed action satisfying a given change condition, the user such as an administrator of a request for approval to change the action execution condition. Then, in response to the user approving the approval request, the policy manager 90 may change the action execution condition.

In this way, the user can control whether or not the action execution condition is to be changed.

In this case, the management supporter 84 may notify, in response to the reception status of the instruction to execute the instructed action satisfying a given change condition, the user such as an administrator of a request for approval to start executing the determination process based on the current performance index value of the element. Then, in response to the user approving the approval request, the policy manager 90 may start executing the determination process.

Figure 13:
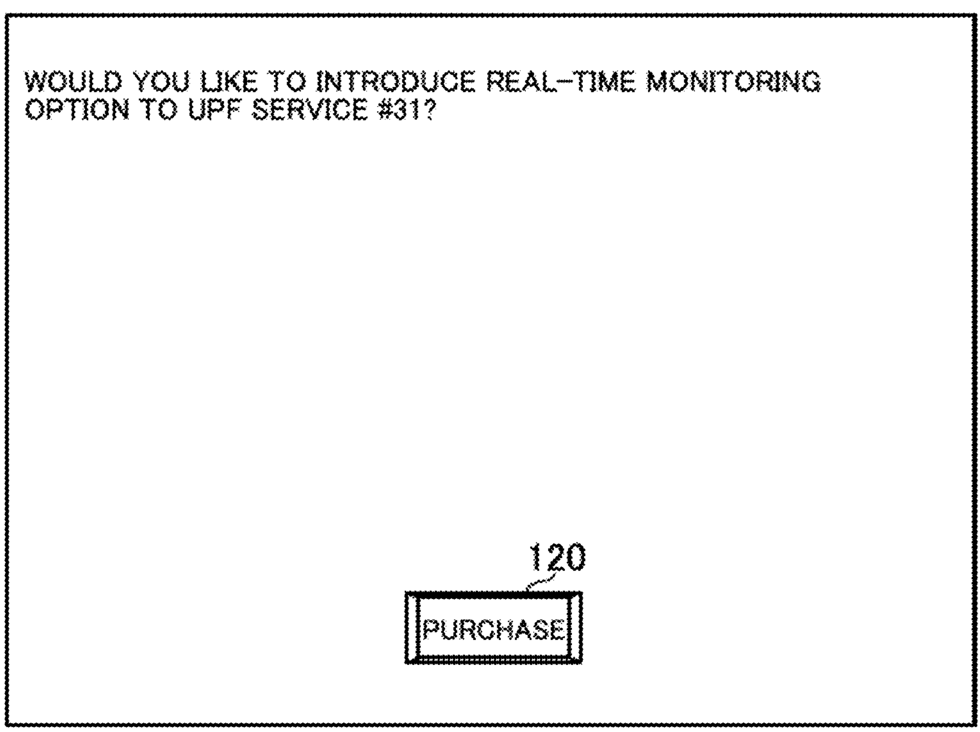
FIG. 13 is a diagram for illustrating an example of a recommendation screen.

For example, the management supporter 84 may transmit a recommendation screen illustrated in FIG. 13 to the purchaser terminal 36 in response to the reception status of the instruction to execute the instructed action satisfying a given change condition. Then, the purchaser terminal 36 may display the recommendation screen on a display or the like. Further, the policy manager 90 may start the operation of the UPF service based on the medium-level option in response to clicking of a purchase button 120 arranged on the recommendation screen.

Further, for example, the management supporter 84 may notify, in response to the reception status of the instruction to execute the instructed action satisfying a given change condition, the user such as an administrator of a request for approval to start predicting the performance index value of the element. Then, in response to the user approving the approval request, the policy manager 90 may start predicting the performance index value of the element.

Figure 14:
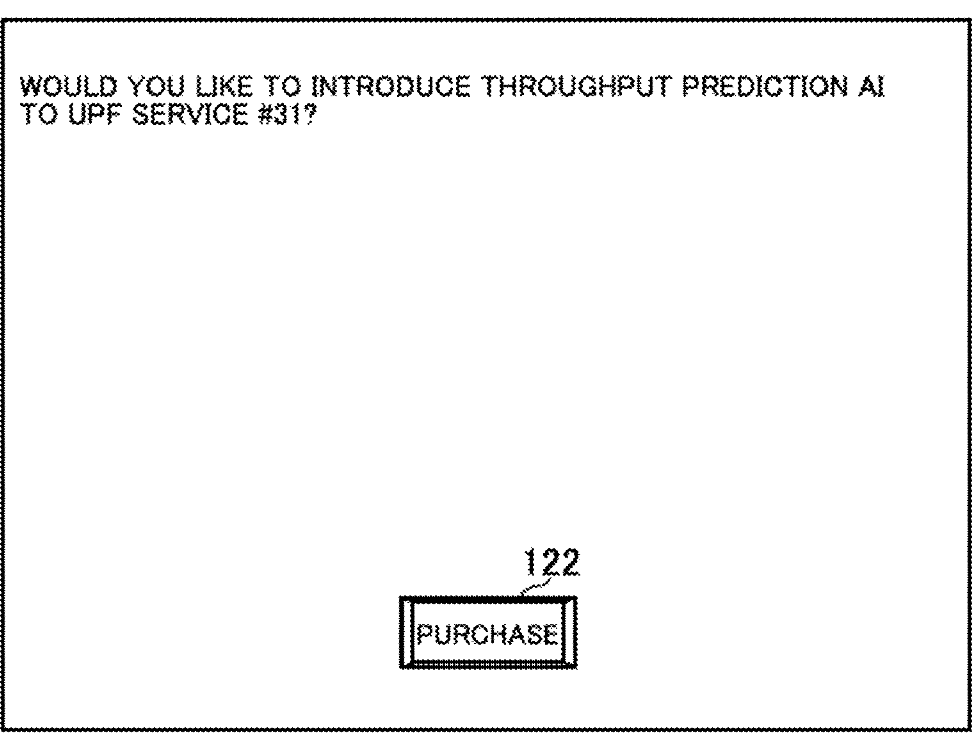
FIG. 14 is a diagram for illustrating an example of a recommendation screen.

For example, the management supporter 84 may transmit a recommendation screen illustrated in FIG. 14 to the purchaser terminal 36 in response to the reception status of the instruction to execute the instructed action satisfying a given change condition. Then, the purchaser terminal 36 may display the recommendation screen on a display or the like. Further, the policy manager 90 may start the operation of the UPF service based on the high-level option in response to clicking of a purchase button 122 arranged on the recommendation screen.

Further, the management supporter 84 may notify the user such as an administrator of a request for approval to start predicting the performance index value of the element after execution of the determination process based on the current performance index value of the element has started in response to approval of the approval request in the manner described above. Then, in response to the user approving the approval request, the policy manager 90 may start predicting the performance index value of the element.

For example, the management supporter 84 may transmit the recommendation screen illustrated in FIG. 14 to the purchaser terminal 36 at the timing when a predetermined time has elapsed (for example, when three months has elapsed) since operation based on the medium-level option started. Then, the purchaser terminal 36 may display the recommendation screen on a display or the like. Further, the policy manager 90 may start the operation of the UPF service based on the high-level option in response to clicking of the purchase button 122 arranged on the recommendation screen.

The above-mentioned actions in the present invention are not limited to scaling out. For example, the above-mentioned actions may be a replacement action or a scale-in action.

For example, in response to a predetermined operation on a replace button, an element determined based on the replace button may be replaced. When the reception status of an instruction received from the user to replace the element satisfies a given change condition, a replacement execution condition for executing replacement of the element may be changed.

Further, for example, in response to a predetermined operation on a scale-in button, an element determined based on the scale-in button may be scaled in. When the reception status of an instruction received from the user to scale in the element satisfies a given change condition, a scale-in execution condition for executing scale-in of the element may be changed.

Further, in the above description, changing from operation based on the low-level option to operation based on the medium-level option or the high-level option has been described, but the present invention can also be applied to changing from operation based on the medium-level option to operation based on the high-level option.

Even when the action execution condition is set and the above-mentioned conditional action is executed, the set condition may not be sufficiently strict for a user such as an administrator. In such a situation, the user may monitor the performance index values of the elements included in the communication system 1 and explicitly instruct the execution of an action on those elements at a timing determined as requiring an action be executed, and the instructed action described above may consequently be executed.

In this embodiment, as described above, when the reception status of the instruction to execute the instructed action satisfies a given change condition, the action execution condition is changed to a condition determined based on the reception status of the execution instruction. After the action execution condition is changed, the conditional action is executed on the element in response to the performance index value satisfying the changed action execution condition.

In this way, in this embodiment, it is possible to optimize the conditions for execution of actions on the elements included in the communication system 1.

[Determination of Machine Learning Model]

Further, in this embodiment, the AI 70 may determine the machine learning model to output the above-mentioned predicted value from among a plurality of trained machine learning models.

In the following description, it is assumed that a machine learning model which outputs a predicted value of the type a1 performance index value for the UPF service having the identifier #31 is determined.

In this case, as described above, it is assumed that the management supporter 84 displays a monitoring screen showing a plurality of types of performance index values.

In this case, the AI 70 may determine the machine learning model to output the predicted value from among a plurality of trained machine learning models based on the types of performance index values shown on the monitoring screen and the types of performance index values included in the input data to be input to each of those plurality of trained machine learning models.

An example of the process for determining the machine learning model in such a determination is now described below.

Further, in the communication system 1 in this embodiment, it is assumed that the AI 70 stores, for each of a plurality of given prediction purposes, a plurality of machine learning 15 models to be used for the prediction purpose, and that those machine learning models are in a state capable of being instantiated.

Figure 15:
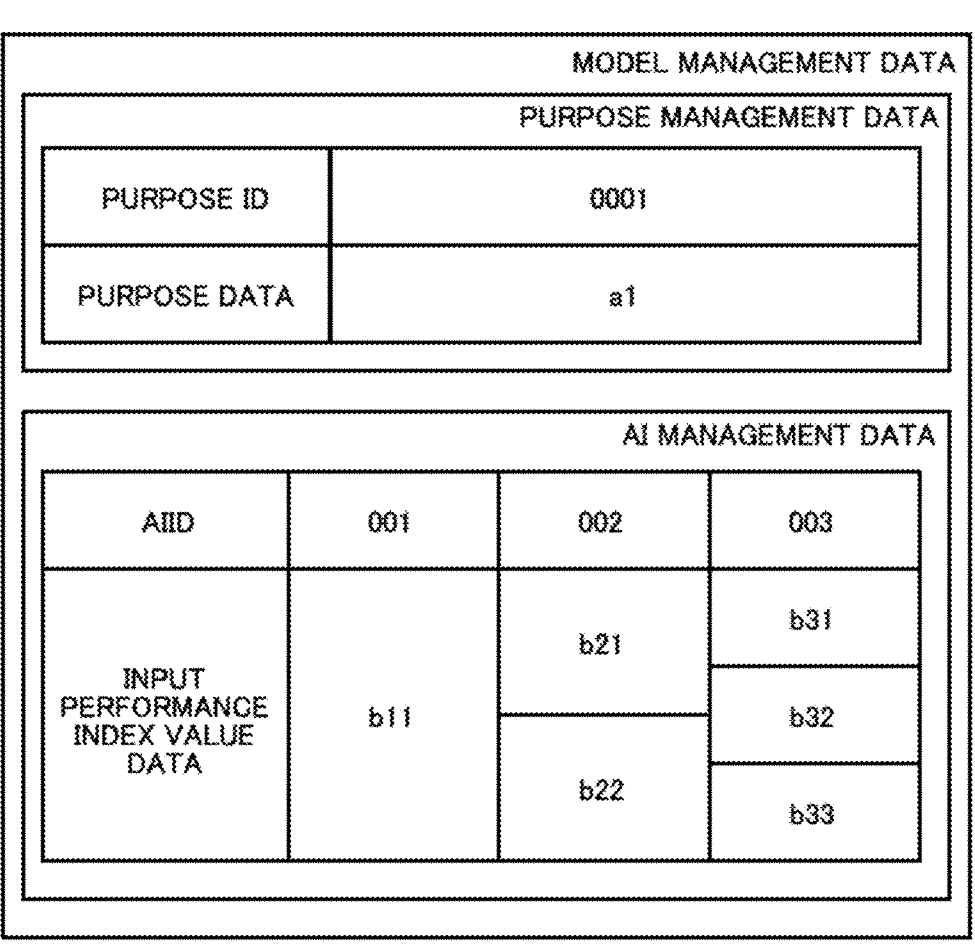
FIG. 15 is a diagram for illustrating an example of model management data.

The inventory database 82 or the AI 70 stores model management data exemplified in FIG. 15, which is data for managing those machine learning models.

In FIG. 15, model management data associated with one prediction purpose is illustrated. In this embodiment, for example, the inventory database 82 or the AI 70 stores, for each of a plurality of prediction purposes, model management data associated with one of those prediction purposes.

As illustrated in FIG. 15, the model management data includes purpose management data and AI management data.

The purpose management data included in the model management data is data associated with the prediction purpose. The purpose management data includes, for example, as illustrated in FIG. 15, a purpose ID and purpose data. The purpose ID included in the purpose management data is, for example, an identifier of the prediction purpose associated with the purpose management data. The purpose data included in the purpose management data is, for example, data indicating the prediction purpose associated with the purpose management data. In the purpose management data illustrated in FIG. 15, the prediction purpose indicated by the purpose data is expressed as "a1."

The machine learning model in this embodiment may output a predicted value of at least one type of performance index value. The purpose data may indicate the type of the performance index value to be predicted. For example, the purpose data may indicate the type of the performance index value, which is the predicted value to be output by the machine learning model. Specifically, for example, the value of the purpose data may be "throughput," "latency," "number of registrations," "number of completed connections," "number of active users," and the like.

Further, the purpose data may indicate a prediction purpose (for example, the type of element and the type of the performance index value to be predicted for the element of that type) relating to a specific type of element included in the communication system 1, such as "UPF throughput."

In addition, the purpose data may indicate the type of a value calculated based on a plurality of types of performance index values. For example, a calculation formula for calculating a comprehensive performance evaluation value based on throughput and latency may be set as the value of the purpose data.

The AI management data included in the model management data is data for managing the machine learning model to be used for the prediction purpose associated with the model management data. The model management data includes a plurality of pieces of AI data each associated with a different machine learning model. The AI data also includes an AI ID and one or a plurality of pieces of input performance index value data.

For example, when three machine learning models having the prediction purpose "a1" are prepared, as illustrated in FIG. 15, three pieces of AI data are included in the model management data. The number of machine learning models to be used for one prediction purpose is not limited to three.

The AI ID included in AI data is an identifier of the machine learning model to be used for the prediction purpose associated with the model management data. In the example of FIG. 15, it is illustrated that the AI IDs of the three machine learning models having the prediction purpose "a1" are "001," "002," and "003," respectively.

The input performance index value data included in the AI data is data indicating the type of performance index value which is input to the machine learning model associated with the AI data. In this embodiment, for example, the same number of pieces of input performance index value data as the number of performance index values input to the machine learning model are included in the AI data associated with the machine learning model.

In the example of FIG. 15, it is illustrated that the type of performance index value that is input to the machine learning model having the AI ID "001" is "b11." It is also illustrated that the types of performance index values that are input to the machine learning model having the AI ID "002" are "b21" and "b22," and that the types of performance index values that are input to the machine learning model having the AI ID "003" are "b31," "b32," and "b33."

In this way, the number of types of performance index values that are input to the machine learning model may differ depending on the machine learning model. In the example of FIG. 15, the number of types of performance index values input to the machine learning model is one to three, but the number of types of performance index values input to the machine learning model may be four or more.

Further, the type of performance index value input to a certain machine learning model may be included in the type of performance index value input to another machine learning model. Moreover, a part of the types of performance index values input to a certain machine learning model may overlap with a part of the types of performance index values input to another machine learning model. For example, "b11" and "b21" may be the same type of performance index value.

Further, in this embodiment, the type of the performance index value indicated by the input performance index value data and the type of performance index value associated with the prediction purpose indicated by the purpose data may be the same or different.

For example, "a1" and "b11" may be the same type of performance index value. For example, a case in which the throughput after a certain time point is predicted based on the output obtained when the actual result value of the throughput at the certain time point is input to the machine learning model corresponds to a case in which the type of the performance index value indicated by the input performance index value data and the type of the performance index value indicated by the purpose data are the same.

Specific examples of types of performance index values that are input include "throughput," "latency," "number of registrations," "number of completed connections," and "number of active users."

In this case, the input performance index value data may indicate the type of element and the type of performance index value for the element of that type. For example, when the performance index value "throughput" for the element "UPF" is input to the machine learning model, the AI data associated with the machine learning model may include input performance index value data having the value "UPF throughput."

In this embodiment, for example, for each of a plurality of pieces of AI data included in model management data including purpose management data indicating a given prediction purpose, it may be determined whether or not the type of the performance index value indicated by the input performance index value data included in the AI data is included in the types of performance index values shown on the monitoring screen.

For example, for each of a plurality of pieces of AI data like that illustrated in FIG. 15, which is included in model management data including purpose management data having "a1" as the prediction purpose indicated by the purpose data, it may be determined whether or not the type of the performance index value indicated by the input performance index value data included in the AI data is included in the types of performance index values shown on the monitoring screen.

Further, it may be determined that, among the types of performance index values indicated by the input performance index value data, the types of performance index values not shown on the monitoring screen are additional performance index value types for the machine learning model associated with the AI data.

In addition, in this embodiment, for example, the AI 70 determines at least one machine learning model from among the plurality of machine learning models based on the additional performance index value types for identified each machine learning model.

In this case, the AI 70 may determine the at least one machine learning model from among the plurality of machine learning models based on the number of additional performance index value types. For example, a machine learning model associated with the AI data having the least number of identified additional performance index value types may be determined. As another example, a machine learning model associated with AI data having fewer identified additional performance index value types than a predetermined number may be determined.

Moreover, the AI 70 may determine at least one machine learning model from among the plurality of machine learning models based on a ratio of the number of additional performance index value types to the number of performance index value types input to the machine learning model. For example, a machine learning model associated with the AI data having the smallest ratio of the number of identified additional performance index value types to the total number of pieces of input performance index value data may be determined. As another example, a machine learning model associated with AI data having a smaller ratio of the number of identified additional performance index value types to the total number of pieces of input performance index value data than a predetermined ratio may be determined.

Further, the AI 70 may add the performance index value of an additional performance index value type that is required to be added in order to use the machine learning model determined in this way to the targets to be monitored by the current status determination process 106*b*. For example, a current status determination process 106*b* associated with the performance index value of an additional performance index value type for the trained machine learning model determined in this way may be generated.

Further, in this embodiment, the AI 70 may determine the machine learning model to output the predicted value from among the plurality of trained machine learning models based on a prediction accuracy of the predicted value evaluated for each of the plurality of trained machine learning models.

Now, an example of the process for determining the machine learning model in such a determination is described.

Figure 16:
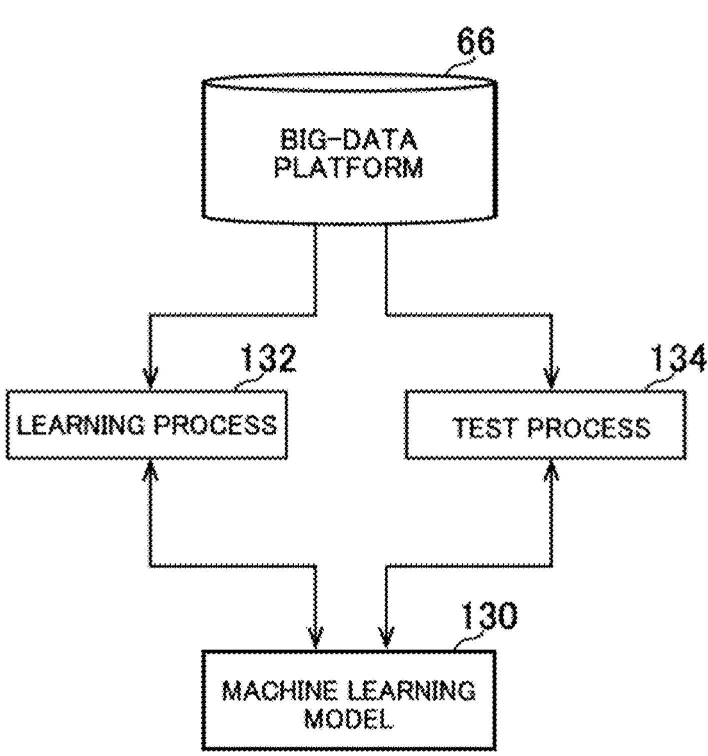
FIG. 16 is a diagram for schematically illustrating an example of a learning process and a test process.

In this case, as illustrated in FIG. 16, the AI 70 instantiates untrained machine learning models 130 and generates a learning process 132 and a test process 134 associated with each untrained machine learning model 130.

In this case, for example, it is assumed that three untrained machine learning models 130 having the AI IDs "001," "002," and "003" are instantiated. The machine learning models 130 having the AI IDs "001," "002," and "003" are hereinafter referred to as "machine learning model 130*a*," "machine learning model 130*b*," and "machine learning model 130*c*," respectively.

It is assumed that a learning process 132*a* associated with the machine learning model 130*a* and a test process 134*a* associated with the machine learning model 130*a* are generated, a learning process 132*b* associated with the machine learning model 130*b* and a test process 134*b* associated with the machine learning model 130*b* are generated, and a learning process 132*c* associated with the machine learning model 130*c* and a test process 134*c* associated with the machine learning model 130*c* are generated.

In this embodiment, as described above, the big-data platform 66 accumulates the performance index value files relating to the elements included in the network service purchased by the purchaser of the network service.

Further, in this embodiment, for example, the AI 70 acquires data indicating a time series of the actual result values of a plurality of types of performance index values relating to the communication system 1.

A part of the data acquired in this way corresponds to test data indicating a time series of the actual result values of the plurality of types of performance index values relating to the communication system 1. The rest of the data corresponds to training data indicating a time series of the actual result values of the plurality of types of performance index values relating to the communication system 1.

In the following description, it is assumed that the above-mentioned plurality of types includes at least the "a1," "b11," "b21," "b22," "b31," "b32," and "b33" illustrated in FIG. 15.

The training data is data different from the test data. For example, data indicating the performance index values until a certain time point may be used as the training data, and data indicating the performance index values after that time point may be used as the test data. As another example, data indicating the performance index values until a certain time point may be used as the test data, and data indicating the performance index values after that time point may be used as the training data.

In this case, for example, the AI 70 acquires at least one performance index value file relating to the element included in the network service purchased by the purchaser accumulated in the big-data platform 66.

Figure 17:
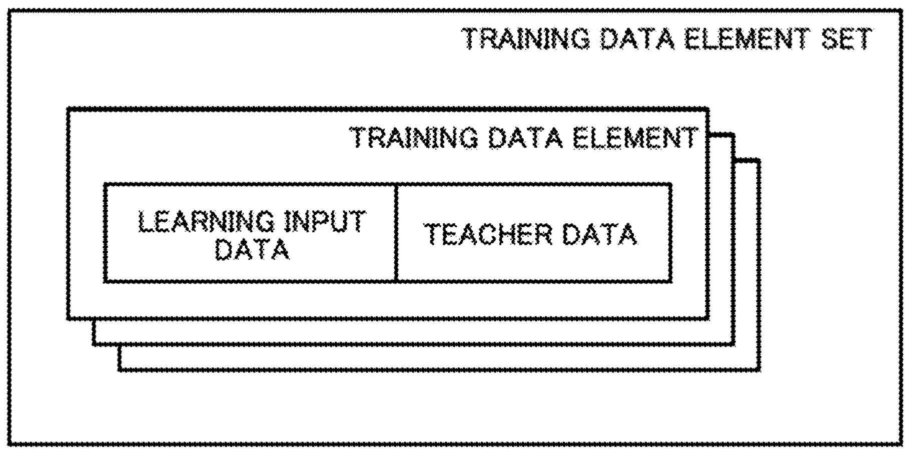
FIG. 17 is a diagram for illustrating an example of a training data element set.

Then, the learning process 132 generates the training data element set illustrated in FIG. 17 based on the training data, which is a part of the data included in the acquired performance index value file. As illustrated in FIG. 17, the training data element set includes a plurality of training data elements, and each training data element includes learning input data and teacher data.

In this case, for example, the learning process 132*a* may generate a training data element which includes learning input data including performance index value data of the performance index value type "b11" and teacher data including performance index value data of the performance index value type "a1", which are included in the performance index value file.

Further, the learning process 132*b* may generate a training data element which includes learning input data including performance index value data of the performance index value type "b21" and performance index value data of the performance index value type "b22," and teacher data including performance index value data of the performance index value type "a1", which are included in the performance index value file.

In addition, the learning process 132*c* may generate a training data element which includes learning input data including performance index value data of the performance index value type "b31," performance index value data of the performance index value type "b32," and performance index value data of the performance index value type "b33," and teacher data including performance index value data of the performance index value type "a1", which are included in the performance index value file.

Figure 18:
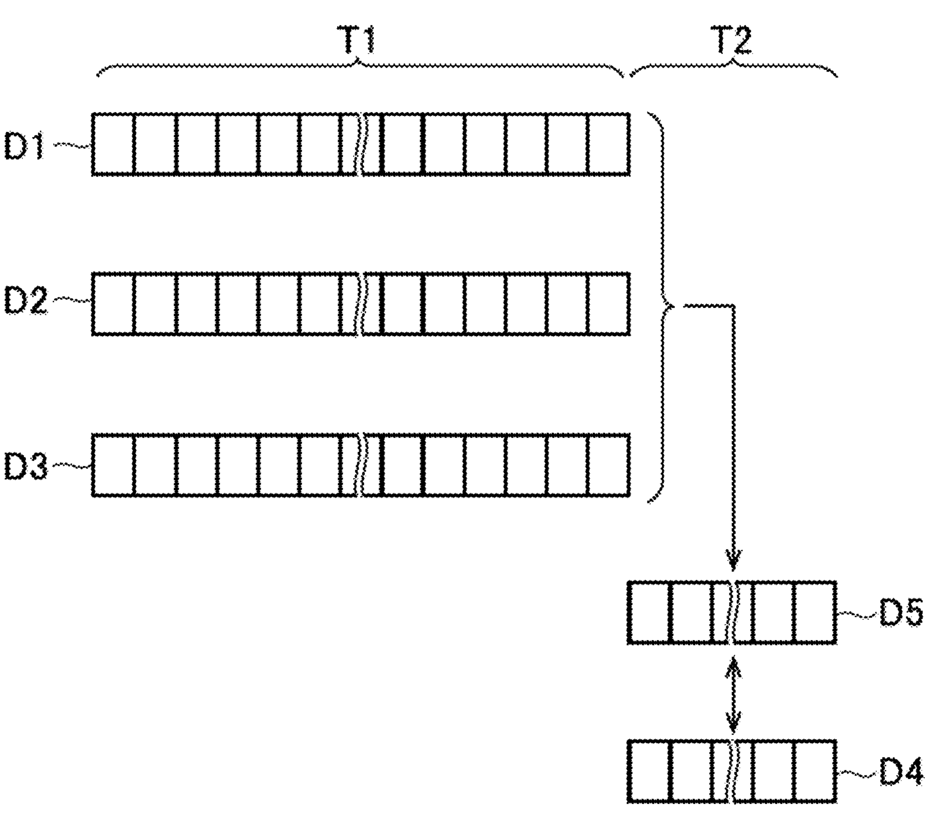
FIG. 18 is a diagram for schematically illustrating an example of a training data element.

FIG. 18 is a diagram for schematically illustrating an example of a training data element generated by the learning process 132*c*. In this case, for example, learning input data including performance index value data D1 indicating a performance index value of type "b31," performance index value data D2 indicating a performance index value of type "b32," and performance index value data D3 indicating a performance index value of type "b33" for a period of a length T1 (for example, 60 minutes) until a certain reference time point is generated. Further, teacher data D4 including performance index value data indicating a performance index value of type "a1" for a period of a length T2 from the reference time point (for example, a period from the reference time point to 20 minutes after the time point) is generated. In addition, a training data element which includes the learning input data and the teacher data generated in this way is generated.

A training data element set including a plurality of the training data elements generated in the manner described above for various reference time points is generated by the learning process 132*c*.

In the same way, a training data element set is generated by the learning process 132*a* and the learning process 132*b*.

In a case in which the machine learning model 130 receives input of performance index value data at a plurality of time points, as illustrated in FIG. 18, the learning input data includes the performance index value data at the plurality of time points. Meanwhile, in a case in which the machine learning model 130 receives input of performance index value data at one time point, the learning input data includes the performance index value data at the one time point.

Further, in a case in which the machine learning model 130 outputs the predicted value at a plurality of time points, as illustrated in FIG. 18, the teacher data includes the performance index value data at the plurality of time points. Meanwhile, in a case in which the machine learning model 130 outputs the predicted value at one time point, the teacher data includes the performance index value data at the one time point.

Then, the learning process 132 generates a trained machine learning model 130 by using the training data element set generated as described above to execute learning of the machine learning model 130 associated with the learning process 132.

In this case, for example, as illustrated in FIG. 18, the learning process 132*c* may calculate the value of a given evaluation function (error function) based on an output D5 obtained when the learning input data included in the training data element is input to the machine learning model 130*c* and the teacher data D4 included in the training data element. The learning process 132*c* may then update a parameter of the machine learning model 130*c* based on the calculated value of the evaluation function. In addition, the learning of the machine learning model 130*c* may be executed by updating the parameter of the machine learning model 130*c* based on each of a plurality of training data elements included in the training data element set generated by the learning process 132*c*, to thereby generate a trained machine learning model 130*c*.

In the same way, a trained machine learning model 130*a* may be generated by executing learning on the machine learning model 130*a* which uses the training data element set generated by the learning process 132*a*. Further, a trained machine learning model 130*b* may be generated by executing learning on the machine learning model 130*b* which uses the training data element set generated by the learning process 132*b*.

In this case, as described above, the machine learning model may output the predicted value calculated based on a plurality of types of performance index values.

In this case, the teacher data may include performance index value data indicating the plurality of types of performance index values. Further, based on the plurality of types of performance index values, a comprehensive performance evaluation value may be calculated in accordance with a given calculation formula. Then, the value of the given evaluation function (error function) may be calculated based on the calculated comprehensive performance evaluation value and the predicted value of the comprehensive performance evaluation value output from the machine learning model.

In another case, a training data element including teacher data in which a comprehensive performance evaluation value calculated in accordance with a given calculation formula based on the plurality of types of performance index values is set may be generated. Then, the value of the given evaluation function (error function) may be calculated based on the comprehensive performance evaluation value indicated by the teacher data and the predicted value of the comprehensive performance evaluation value output from the machine learning model.

As described above, the machine learning model may output a predicted value of the same type of performance index value as that of the input performance index value.

In this case, a training data element including learning input data indicating a certain type of performance index value for the period of the length T1 until the reference time point and teacher data indicating the type of performance index value for the period of the length T2 from the reference time point may be generated. Then, the value of the given evaluation function (error function) may be calculated based on the performance evaluation value indicated by the teacher data and the predicted value output from the machine learning model.

Figure 19:
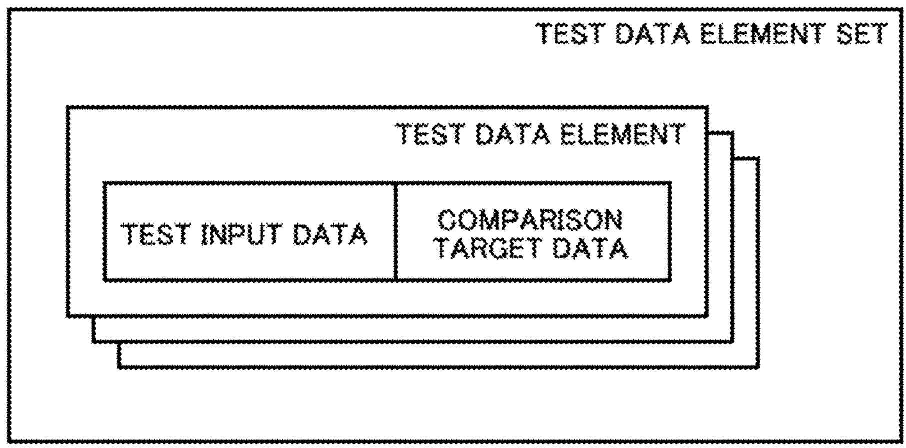
FIG. 19 is a diagram for illustrating an example of a test data element set.

Further, the test process 134 generates the test data element set illustrated in FIG. 19 based on the test data included in the performance index value file acquired as described above. As illustrated in FIG. 19, the test data element set includes a plurality of test data elements, and each test data element includes test input data and comparison target data.

In this case, for example, the test process 134*a* may generate a test data element which includes test input data including performance index value data of the performance index value type "b11" and comparison target data including performance index value data of the performance index value type "a1", which are included in the performance index value file.

Further, the test process 134*b* may generate a test data element which includes test input data including performance index value data of the performance index value type "b21" and performance index value data of the performance index value type "b22," and comparison target data including performance index value data of the performance index value type "a1", which are included in the performance index value file.

In addition, the test process 134*c* may generate a test data element which includes test input data including performance index value data of the performance index value type "b31," performance index value data of the performance index value type "b32," and performance index value data of the performance index value type "b33," and comparison target data including performance index value data of the performance index value type "a1", which are included in the performance index value file.

Figure 20:
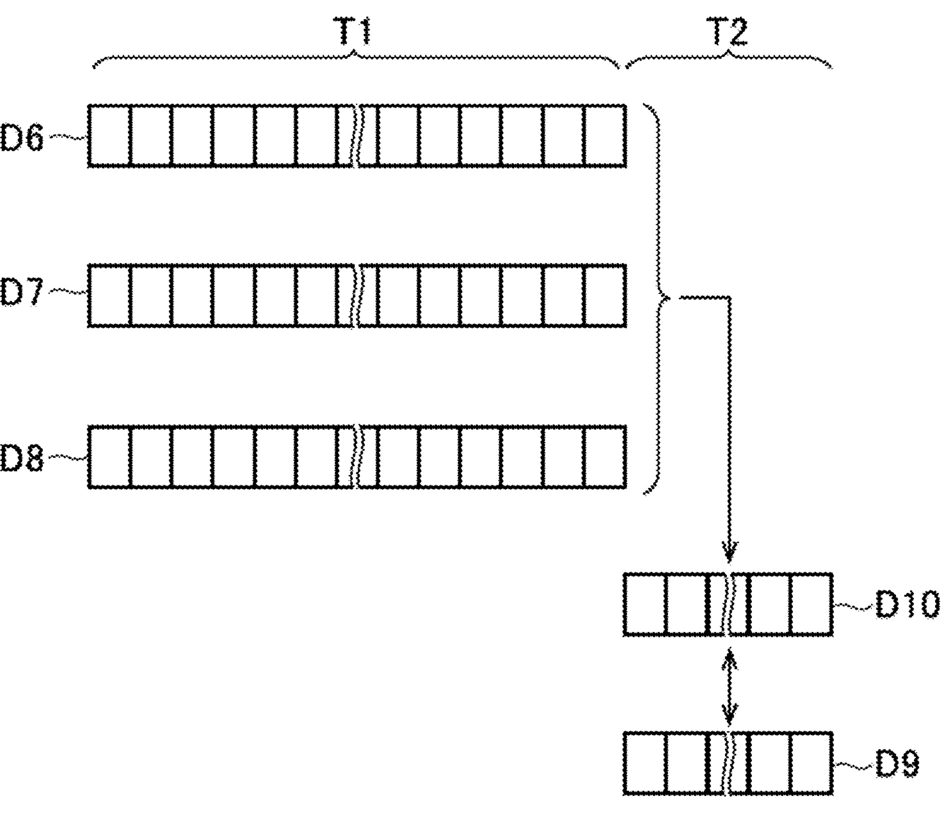
FIG. 20 is a diagram for schematically illustrating an example of a test data element.

FIG. 20 is a diagram for schematically illustrating an example of a test data element generated by the test process 134*c*. In this case, for example, test input data including performance index value data D6 indicating a performance index value of type "b31," performance index value data D7 indicating a performance index value of type "b32," and performance index value data D8 indicating a performance index value of type "b33" for a period of a length T1 (for example, 60 minutes) until a certain reference time point is generated. Further, comparison target data D9 including performance index value data indicating a performance index value of type "a1" for a period of a length T2 from the reference time point (for example, a period from the reference time point to 20 minutes after the time point) is generated. In addition, a test data element which includes the test input data and the comparison target data generated in this way is generated.

A test data element set including a plurality of the test data elements generated in the manner described above for various reference time points is generated by the test process 134*c*.

In the same way, a test data element set is generated by the test process 134*a* and the test process 134*b*.

In this way, test data elements having the same format as the format of the training data are generated.

In this embodiment, for example, the type of the performance index value indicated by the performance index value data included in the learning input data corresponding to the machine learning model is the same as the type of the performance index value indicated by the performance index value data included in the test input data corresponding to the machine learning model. Further, the type of the performance index value indicated by the performance index value data included in the teacher data corresponding to the machine learning model is the same as the type of the performance index value indicated by the performance index value data included in the comparison target data corresponding to the machine learning model.

Further, in this embodiment, for example, the number of pieces of performance index value data included in the learning input data corresponding to the machine learning model is the same as the number of pieces of performance index value data included in the test input data corresponding to the machine learning model. Further, the number of pieces of performance index value data included in the teacher data corresponding to the machine learning model is the same as the number of pieces of performance index value data included in the comparison target data corresponding to the machine learning model.

In this embodiment, as described above, the training data and test data are different data, and the training data is not used as the test data.

Further, in this embodiment, for example, the AI 70 inputs, to each of a plurality of trained machine learning models 130 to be used for a given prediction purpose relating to the communication system 1, input data corresponding to the machine learning model 130. In this case, the input data is a part of the test data, and is data indicating the actual result value of the performance index value at at least one time point of at least one type. Moreover, the pieces of input data input to the plurality of trained machine learning models 130 are different from each other. In addition, in this embodiment, for example, the AI 70 acquires, as the output of the machine learning model 130, a predicted value at a prediction time point later than all of the above-mentioned at least one time point.

As described above, the type of the actual result value indicated by the input data and the type of the predicted value output from the machine learning model 130 may be the same or different.

For example, the test process 134 inputs, to the trained machine learning model 130, test input data which is included in the test data element and indicates a performance index value at at least one time point. The test process 134 acquires the output obtained when the test input data is input to the machine learning model 130. The output indicates the predicted value at a prediction time point later than all of the above-mentioned at least one time point. For example, as illustrated in FIG. 20, the test process 134*c* acquires an output D10 obtained when the test data element is input to the machine learning model 130*c*. The predicted value indicated by the output D10 is the predicted value of the performance index value of the type "a1."

Further, in this embodiment, for example, the AI 70 evaluates the accuracy of the prediction relating to the above-mentioned prediction purpose of each of the plurality of trained machine learning models based on the acquired predicted value and a part of the test data indicating the actual result value at prediction time point of at least one type corresponding to the predicted value.

For example, the test process 134 evaluates the accuracy of the prediction relating to the above-mentioned prediction purpose by a trained machine learning model 130 based on the comparison target data included in a test data element and the output obtained when the test input data included in the test data element is input to the machine learning model 130.

In this case, for example, the test process 134 may calculate the value of a given evaluation function (error function) based on the comparison target data included in a test data element and the output obtained when the test input data included in the test data element is input to the machine learning model 130. Further, the test process 134 may calculate a representative value (for example, sum or average) of the evaluation function calculated for a plurality of test data elements as the evaluation value of the accuracy of the prediction relating to the above-mentioned prediction purpose by the machine learning model.

For example, the test process 134*c* calculates the value of a given evaluation function based on the comparison target data D9 included in the test data element and the output D10. Then, the test process 134*c* evaluates the accuracy of the prediction relating to the prediction purpose "a1" by the machine learning model 130*c* based on the value of the evaluation function calculated for each of the plurality of test data elements included in the test data element set.

The AI 70 determines at least one machine learning model 130 from among the plurality of trained machine learning models 130 based on the evaluation result of the prediction accuracy for each of the plurality of machine learning models 130. For example, a machine learning model suited to the communication system 1 is determined.

In this case, the AI 70 may, for example, determine the machine learning model 130 having the smallest representative value of the evaluation function as the machine learning model suited to the network service. Further, the AI 70 may determine, for example, one or a plurality of machine learning models 130 having a representative value of the evaluation function that is smaller than a predetermined value as the machine learning model suited to the network service.

As described above, the machine learning model may output a predicted value calculated based on a plurality of types of performance index values.

In this case, the comparison target data may include performance index value data indicating the plurality of types of performance index values. A comprehensive performance evaluation value may be calculated in accordance with a given calculation formula based on the plurality of types of performance index values. Then, the value of the given evaluation function (error function) may be calculated based on the calculated comprehensive performance evaluation value and the predicted value of the comprehensive performance evaluation value output from the machine learning model.

As another example, a test data element including comparison target data in which a comprehensive performance evaluation value calculated in accordance with a given calculation formula based on a plurality of types of performance index values is set may be generated. Then, the value of the given evaluation function (error function) may be calculated based on the comprehensive performance evaluation value indicated by the comparison target data and the predicted value of the comprehensive performance evaluation value output from the machine learning model.

Further, as described above, the machine learning model may output the predicted value of the same type of performance index value as that of the input performance index value.

In this case, a test data element including test input data indicating a certain type of performance index value for a period of a length T1 until the reference time point and comparison target data indicating that type of performance index value for a period of a length 12 from the reference time point may be generated. Then, the value of the given evaluation function (error function) may be calculated based on the performance evaluation value indicated by the comparison target data and the predicted value output from the machine learning model.

Further, the AI 70 may add the types of performance index values that are required to be added in order to use the machine learning model determined in this way to the targets to be monitored by the current status determination process 106*b*. For example, a current status determination process 106*b* associated with a type of performance index value that is required to be added in order to use the machine learning model determined in this way may be generated. Then, a determination process (in other words, a process for monitoring at least one type of performance index value relating to the communication system 1) may be executed by the generated current status determination process 106*b*.

In this way, the machine learning model to output the predicted value is determined.

An estimation process 108 and a prediction determination process 106*c* linked to the current status determination process 106*b* may then be generated. In this case, for example, the estimation process 108 and the prediction determination process 106*c* may be activated. At this time, the trained machine learning model determined in this way may then be instantiated. The estimation process 108 may then predict the performance index value of the communication system 1 by using the machine learning model determined in this way.

Further, in this embodiment, for each of a plurality of prediction purposes, at least one machine learning model (for example, at least one machine learning model suited to the communication system 1) is determined from among a plurality of machine learning models to be used for the prediction purpose. As a result, it is possible to accurately determine a machine learning model suited to the communication system 1 to be used to predict the performance index value of the communication system 1.

[Process Flow]

Figure 21:
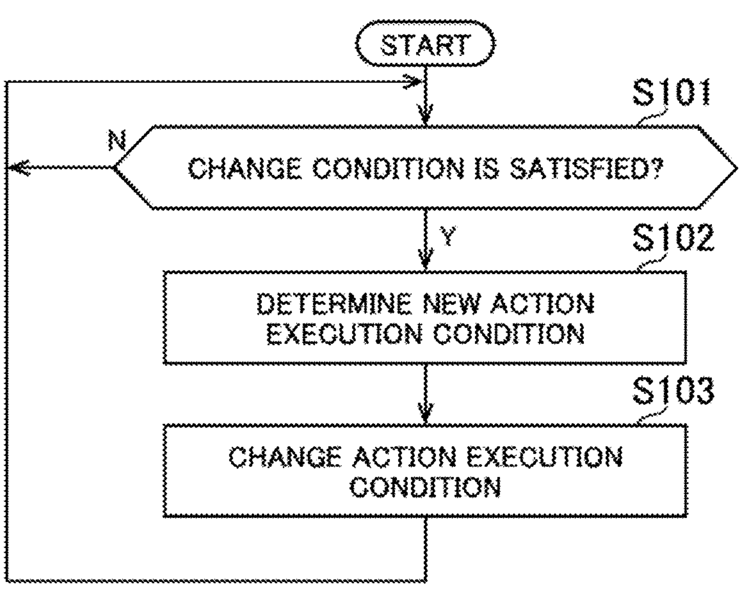
FIG. 21 is a flow chart for illustrating an example of a flow of a process performed by the platform system in the one embodiment of the present invention.

An example of a flow of a process relating to changing an action execution condition performed by the platform system 30 in this embodiment is now described with reference to a flow chart illustrated in FIG. 21. The following process is executed on each element having performance information arranged on the monitoring screen. In the following description, one element among those elements is focused on, and an example of the flow of the process executed on that element is described.

First, the management supporter 84 monitors whether or not the reception status of an instruction to execute an instructed action on the element satisfies a given change condition (Step S101).

When the reception status satisfies the given change condition, the policy manager 90 determines a new action execution condition (Step S102).

Then, the policy manager 90 changes the action execution condition to the condition determined in the process step of Step S102 (Step S103), and the process returns to the process step of Step S101.

[Supplement]

It should be noted that the present invention is not limited to the embodiment described above.

For example, in the embodiment described above, scaling out of types of elements other than the elements described above may be executed. For example, scaling out of the SMF 48 may be executed. Further, in this case, performance index value data relating to the elements of the RAN 32 and the elements of the core network system 34 may be used to determine whether to execute scaling out.

Further, scaling out of transport may be executed in the same way.

In addition, the process for determining the machine learning model described above and the processes relating to the determination process may be executed by a functional module other than the AI 70.

Further, the functional unit in this embodiment is not limited to those illustrated in FIG. 3.

Further, the functional unit in this embodiment is not required to be an NF in 5G. For example, the functional unit in this embodiment may be an eNodeB, a vDU, a vCU, a packet data network gateway (P-GW), a serving gateway (S-GW), a mobility management entity (MME), a home subscriber server (HSS), or another network node in 4G.

Further, the functional unit in this embodiment may be implemented through use of a hypervisor-type or host-type virtualization technology instead of the container-type virtualization technology. Further, the functional unit in this embodiment is not required to be implemented by software, and may be implemented by hardware such as an electronic circuit.

Further, the functional unit in this embodiment may be implemented by a combination of an electronic circuit and software.

The technology disclosed in the present disclosure can also be expressed as follows.

[1] An action execution control system including: performance information provision means for providing performance information indicating a performance index value of an element included in a communication system; conditional action execution means for executing an action on the element in response to the performance index value satisfying a given action execution condition; instructed action execution means for executing the action on the element in response to an instruction to execute the action on the element received in a situation in which the performance index value does not satisfy the action execution condition; and condition change means for changing, when a reception status of the execution instruction satisfies a given change condition, the action execution condition to a condition determined based on the reception status of the execution instruction, and wherein, after the action execution condition is changed, the conditional action execution means is configured to execute the action on the element in response to the performance index value satisfying the changed action execution condition.

[2] The action execution control system according to Item [1], wherein the condition change means is configured to change the action execution condition to a condition determined based on the performance index value at a timing when the instruction to execute the action is received.

[3] The action execution control system according to Item [2], wherein the condition change means is configured to change the action execution condition to a condition determined based on the performance index value at each of a plurality of timings at which the instruction to execute the action is received.

[4] The action execution control system according to Item [1], wherein the condition change means is configured to change the action execution condition to a condition determined based on the performance index value at a timing when the instruction to execute the action is received and the action execution condition at the timing.

[5] The action execution control system according to Item [4], wherein the condition change means is configured to change the action execution condition to a condition determined based on the performance index value at each of a plurality of timings at which the instruction to execute the action is received and the action execution condition at a final timing among the plurality of timings.

[6] The action execution control system according to any one of Items [1] to [5], wherein the performance information means is configured to provide the performance provision information on a plurality of the elements, wherein the condition change means is configured to change, when the reception status of the instruction to execute the action on any one of the plurality of the elements satisfies the change condition, the action execution condition of the any one of the plurality of the elements to a condition determined based on the reception status of the execution instruction, and wherein, after the action execution condition of the any one of the plurality of the elements is changed, the conditional action execution means is configured to execute the action on the any one of the plurality of the elements in response to the performance index value satisfying the changed action execution condition.

[7] The action execution control system according to any one of Items [1] to [6], further including determination process execution start means for starting executing a determination process based on the performance index value of the element when the reception status of the execution instruction satisfies the change condition, and wherein, after the action execution condition is changed, the conditional action execution means is configured to execute the action on the element in response to a determination that the changed action execution condition is satisfied in the determination process.

[8] The action execution control system according to Item [7], wherein the determination process execution start means is configured to start, when the reception status of the execution instruction satisfies the change condition, executing the determination process for determining whether the performance index value of the element satisfies the changed action execution condition at a higher frequency than before the reception status of the execution instruction satisfies the change condition.

[9] The action execution control system according to Item [7], wherein the determination process execution start means is configured to start executing the determination process for determining whether a predicted value of the performance index value of the element satisfies the changed action execution condition when the reception status of the execution instruction satisfies the change condition.

[10] The action execution control system according to Item [7], wherein the determination process execution start means is configured to start, when the reception status of the execution instruction satisfies a first change condition, executing the determination process for determining whether the performance index value of the element satisfies the changed action execution condition at a higher frequency than before the reception status of the execution instruction satisfies the first change condition, and wherein the determination process execution start means is configured to start, when the reception status of the execution instruction satisfies a second Change condition, executing the determination process for determining whether a predicted value of the performance index value of the element satisfies the changed action execution condition.

[11] The action execution control system according to Item [9] or [10], further including machine learning model determination means for determining a machine learning model which outputs the predicted value from among a plurality of trained machine learning models.

[12] The action execution control system according to Item [11], wherein the performance information provision means is configured to display a monitoring screen showing a plurality of types of performance index values, and wherein the machine learning model determination means is configured to determine the machine learning model which outputs the predicted value from among the plurality of trained machine learning models based on the plurality of types of performance index values shown on the monitoring screen and types of performance index values included in input data to be input to each of the plurality of trained machine learning models.

[13] The action execution control system according to Item [11], wherein the machine learning model determination means is configured to determine the machine learning model which outputs the predicted value from among the plurality of trained machine learning models based on a prediction accuracy of the predicted value evaluated for each of the plurality of trained machine learning models.

[14] The action execution control system according to any one of Items [1] to [13], further including approval request notification means for notifying a user of a request for approval to change the action execution condition in response to the reception status of the execution instruction satisfying the change condition, and wherein the condition change means is configured to change the action execution condition in response to the user approving the approval request.

[15] An action execution control method including: providing performance information indicating a performance index value of an element included in a communication system; executing an action on the element in response to the performance index value satisfying a given action execution condition; executing the action on the element in response to an instruction to execute the action on the element received in a situation in which the performance index value does not satisfy the action execution condition; changing, when a reception status of the execution instruction satisfies a given change condition, the action execution condition to a condition determined based on the reception status of the execution instruction; and executing, after the action execution condition is changed, the action on the element in response to the performance index value satisfying the changed action execution condition.

The invention claimed is:

1. An action execution control system, comprising one or more processors, the action execution control system causing at least one of the one or more processors to execute:

a performance information provision process of providing performance information indicating a performance index value of an element included in a communication system;

a conditional action execution process of executing an action on the element in response to the performance index value satisfying a given action execution condition;

an instructed action execution process of executing the action on the element in response to an instruction to execute the action on the element received in a situation in which the performance index value does not satisfy the action execution condition; and a condition change process of changing, when a reception status of the execution instruction satisfies a given change condition, the action execution condition to a condition determined based on the reception status of the execution instruction, wherein, after the action execution condition is changed, in the conditional action execution process, the action on the element is executed in response to the performance index value satisfying the changed action execution condition.

2. The action execution control system according to claim 1, wherein, in the condition change process, the action execution condition is changed to a condition determined based on the performance index value at a timing when the instruction to execute the action is received.

3. The action execution control system according to claim 2, wherein, in the condition change process, the action execution condition is changed to a condition determined based on the performance index value at each of a plurality of timings at which the instruction to execute the action is received.

4. The action execution control system according to claim 1, wherein, in the condition change process, the action execution condition is changed to a condition determined based on the performance index value at a timing when the instruction to execute the action is received and the action execution condition at the timing.

5. The action execution control system according to claim 4, wherein, in the condition change process, the action execution condition is changed to a condition determined based on the performance index value at each of a plurality of timings at which the instruction to execute the action is received and the action execution condition at a final timing among the plurality of timings.

6. The action execution control system according to claim 1, wherein, in the performance information provision process, the performance information on a plurality of the elements is provided, wherein, in the condition change process, when the reception status of the instruction to execute the action on any one of the plurality of the elements satisfies the change condition, the action execution condition of the any one of the plurality of the elements is changed to a condition determined based on the reception status of the execution instruction, and wherein, after the action execution condition of the any one of the plurality of the elements is changed, in the conditional action execution process, the action on the any one of the plurality of the elements is executed in response to the performance index value satisfying the changed action execution condition.

7. The action execution control system according to claim 1, wherein the action execution control system causes the at least one of the one or more processors to start executing a determination process based on the performance index value of the element when the reception status of the execution instruction satisfies the change condition, and wherein, after the action execution condition is changed, in the conditional action execution process, the action on the element is executed in response to a determination that the changed action execution condition is satisfied in the determination process.

8. The action execution control system according to claim 7, wherein, in the determination process, it is determined whether the performance index value of the element satisfies the changed action execution condition at a higher frequency than before the reception status of the execution instruction satisfies the change condition.

9. The action execution control system according to claim 7, wherein, in the determination process, it is determined whether a predicted value of the performance index value of the element satisfies the changed action execution condition.

10. The action execution control system according to claim 7, wherein when the reception status of the execution instruction satisfies a first change condition, execution of the determination process of determining whether the performance index value of the element satisfies the changed action execution condition at a higher frequency than before the reception status of the execution instruction satisfies the first change condition is started, and wherein when the reception status of the execution instruction satisfies a second change condition, execution of the determination process of determining whether a predicted value of the performance index value of the element satisfies the changed action execution condition is started.

11. The action execution control system according to claim 9, wherein the action execution control system causes the at least one of the one or more processors to execute a machine learning model determination process of determining a machine learning model which outputs the predicted value from among a plurality of trained machine learning models.

12. The action execution control system according to claim 11, wherein, in the performance information provision process, a monitoring screen showing a plurality of types of performance index values is displayed, and wherein, in the machine learning model determination process, the machine learning model which outputs the predicted value is determined from among the plurality of trained machine learning models based on the plurality of types of performance index values shown the monitoring screen and types of performance index values included in input data to be input to each of the plurality of trained machine learning models.

13. The action execution control system according to claim 11, wherein, in the machine learning model determination process, the machine learning model which outputs the predicted value is determined from among the plurality of trained machine learning models based on a prediction accuracy of the predicted value evaluated for each of the plurality of trained machine learning models.

14. The action execution control system according to claim 1, wherein the action execution control system causes the at least one of the one or more processors to execute an approval request notification process for notifying a user of a request for approval to change the action execution condition in response to the reception status of the execution instruction satisfying the change condition, and wherein, in the condition change process, the action execution condition is changed in response to the user approving the approval request.

15. An action execution control method, comprising:

providing performance information indicating a performance index value of an element included in a communication system;

executing an action on the element in response to the performance index value satisfying a given action execution condition;

executing the action on the element in response to an instruction to execute the action on the element received in a situation in which the performance index value does not satisfy the action execution condition;

changing, when a reception status of the execution instruction satisfies a given change condition, the action execution condition to a condition determined based on the reception status of the execution instruction; and executing, after the action execution condition is changed, the action on the element in response to the performance index value satisfying the changed action execution condition.

* * * * *